United States Patent
Kumazawa et al.

(10) Patent No.: US 8,369,293 B2
(45) Date of Patent: Feb. 5, 2013

(54) MOBILE ROUTER, HOME AGENT, AND TERMINAL POSITION MANAGEMENT METHOD

(75) Inventors: Masayuki Kumazawa, Kanagawa (JP); Taisuke Matsumoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1261 days.

(21) Appl. No.: 11/909,869

(22) PCT Filed: Mar. 27, 2006

(86) PCT No.: PCT/JP2006/306070
§ 371 (c)(1),
(2), (4) Date: Sep. 27, 2007

(87) PCT Pub. No.: WO2006/104065
PCT Pub. Date: Oct. 5, 2006

(65) Prior Publication Data
US 2009/0052416 A1   Feb. 26, 2009

(30) Foreign Application Priority Data
Mar. 28, 2005   (JP) ................. 2005-090923

(51) Int. Cl.
*H04W 4/00* (2009.01)
(52) U.S. Cl. ........................ 370/338; 455/445
(58) Field of Classification Search .............. 370/338, 370/331, 389
See application file for complete search history.

(56) References Cited

U.S. PATENT DOCUMENTS

| | | | |
|---|---|---|---|
| 7,609,687 B2 * | 10/2009 | Kobayashi et al. | 370/356 |
| 2003/0117965 A1 * | 6/2003 | Markki et al. | 370/254 |
| 2004/0228335 A1 * | 11/2004 | Park et al. | 370/352 |
| 2005/0195773 A1 * | 9/2005 | Popovich et al. | 370/338 |

FOREIGN PATENT DOCUMENTS

| | | |
|---|---|---|
| JP | 2003-283546 A | 10/2003 |
| JP | 2004-364271 A | 12/2004 |
| JP | 2005-252997 A | 9/2005 |

OTHER PUBLICATIONS

Junya Kato et al., "Ubiquitous Gateway ni yoru Ido Kankyo no Jitsugen Hoshiki", Information Processing Society of Japan Dai 66 Kai Zenkoku Taikai Koen Ronbunshu (3), Mar. 9, 2004.
V. Devarapalli et al., Network Mobility (NEMO) Basic Support Protocol, The Internet Society, Jan. 2005.
International Search Report for PCT/JP2006/306070, dated Apr. 18, 2006.

* cited by examiner

*Primary Examiner* — David Oveissi
(74) *Attorney, Agent, or Firm* — RatnerPrestia

(57) ABSTRACT

In a mobile network system composed of plural mobile networks and a home agent, the home agent inquires mobile routers in a mobile network whether or not a terminal is connected, if detecting the absence of the terminal, when data addressed to the terminal arrives at a home network of the terminal in the mobile network. Responding to this inquiry, the mobile routers search whether or not the terminal is connected to the own mobile networks. If the terminal is connected, the mobile routers inform the home agent of the presence of the terminal. When receiving this notice, the home agent transfers data addressed to this terminal to a mobile router as a notice source. This process, even if a terminal moves to a mobile network having a same network prefix as that of the home network, allows transferring a packet accurately to the terminal.

13 Claims, 22 Drawing Sheets

FIG. 14

| HA | HoA | CoA |
|---|---|---|
| Addr_HA | HoA | CoA |
| | | |

| NID | Transmission source | Allocation time |
|---|---|---|
| 3 | 1 | 11:04 |

| NID | Transmission source | Allocation time |
|---|---|---|
| 2 | 0 | 11:03 |

| HoA (2101) | CoA (2102) | NID (2103) |
|---|---|---|
| HoA_MR5 | CoA_MR5 | 1 |
| HoA_MR6 | CoA_MR6 | 2 |
| HoA_MR7 | CoA_MR7 | 3 |

FIG. 16B

| HoA (2101) | CoA (2102) | NID (2103) |
|---|---|---|
| HoA_MR5 | CoA_MR5 | 1 |
| HoA_MR6 | CoA_MR6 | 2 |
| HoA_MR7 | CoA_MR7 | 2 |

FIG. 17

| Terminal address (2301) | NID (2302) |
|---|---|
| Addr_T8 | 1 |

MOBILE ROUTER, HOME AGENT, AND TERMINAL POSITION MANAGEMENT METHOD

This application is a U.S. National Phase Application of PCT International Application PCT/W2006/306070.

TECHNICAL FIELD

The present invention relates to a method for managing a position of connecting a terminal in a mobile network system composed of plural mobile networks, each having a network prefix same as that of a home network, and of a home agent that manages addresses of the mobile networks, and to a mobile router and a home agent implementing the method.

BACKGROUND ART

Conventionally, a technique for providing mobility of the entire network composed of a movable terminal group and a router has been examined in IETF NEMO WG.

NEMO (Network Mobility) described in the document *Network Mobility (NEMO) Basic Support Protocol* (written by Vijay Devarapalli et al., draft-ietf-nemo-basic-support-02.txt) is a technique that implements data communication between a node in a "mobile network" and a node in an external network, by means of the mobile network and a home agent that manages the position of the mobile network, where "mobile network" refers to a network composed of the movable terminal group, and a mobile router connecting to an external network such as the Internet.

FIG. 24 illustrates a conventional mobile network system disclosed in the document *Network Mobility (NEMO) Basic Support Protocol*.

In FIG. 24, terminal 8 connected to home network 2 connects to global network 1 such as the Internet through home gateway (HGW) 12 and can communicate with plural terminals 9 connected to global network 1.

Mobile routers (MR) 5, 6, 7 connected to mobile networks 3, 4 connect to global network 1 through access router (AR) 11.

In this case, the mobile networks need to be composed as respectively independent networks, and thus the network prefix of home network 2 (Pref_Home), that of mobile network 3 (Pref_NEMO3), and that of mobile network 4 (Pref_NEMO4) need to be set differently from one another. Here, these prefixes are assumed to be Pref_Home (1:1:1:/48), Pref_NEMO3 (1:1:1:3/64), and Pref_NEMO4 (1:1:1:4/64), respectively.

When connecting to access router (AR) 11, mobile routers 5, 6, 7 acquire network prefix information advertised by access router 11, or issue a request to the DHCP server (not illustrated), to acquire a care-of address (CoA), and then register the address in home agent (HA) 10.

Here, when terminal 8 disconnects with home network 2 and moves to mobile network 3, terminal 8 combines Pref_NEMO3 included in router information advertised from mobile router 5 or 6, and terminal address (assumed to be 0:0:0:8) to create address 1:1:1:3::8.

After then, when a packet addressed to terminal 8 positioned at address 1:1:1:3::8 arrives at home network 2, home agent 10 acquires the packet. Then, home agent 10 transfers the packet acquired to mobile router 5 or 6. Home agent 10 encapsulates the data addressed to terminal 8 to perform tunneling transfer between mobile router 5 or 6 and home agent 10.

In this way, while connecting to home network 2, mobile routers 5, 6, 7 relay a communication packet addressed to the terminal by use of Home address (HoA) within mobile networks. While connecting to access router 11, home agent 10 relays a communication packet addressed to terminal 8 within the mobile networks 3, 4.

This process causes a communication packet addressed to terminal 8 to be transferred from home agent 10 to mobile routers 5, 6, 7 by tunneling, even if a mobile network that terminal 8 connects to moves during communication between terminal 8 and terminal 9, and connects to access router 11 different from a HGW. Consequently, communication between terminal 8 and terminal 9 is maintained without interruption.

With the above-described conventional configuration, however, the address of terminal 8 remains to be 1:1:1:3::8 even if terminal 8 that has been connected to mobile network 3 moves alone to connect to mobile network 4, and thus a packet addressed to terminal 8 results in being sent to mobile network 3.

In order to prevent this problem, terminal 8 needs to reacquire an address (e.g. 1:1:1::8 for home network 2) when moving to another network. Then, terminal 8 needs to perform a process such as changing DNS settings by means of Dynamic DNS or the like when reacquiring an address. If terminal 8 fails to do it, home agent 10 becomes unable to transmit a packet to terminal 8. However, even if using Dynamic DNS, the address is changed when terminal 8 moves between networks, disconnecting a session between terminal 8 and terminal 9. Further, it is not practical that all the terminals implement Dynamic DNS because of problems such as cost.

SUMMARY OF THE INVENTION

An object of the present invention is to provide a method for managing a terminal position, the method for transferring a packet accurately to a terminal not having routing function even if the terminal moves between plural mobile networks, and to provide a mobile router and a home agent for implementing the method.

A mobile network system for implementing the terminal position managing method of the present invention is composed of plural mobile networks with a mobile router and a terminal interconnected, having a network prefix same as that of a home network, and of a home agent for managing the position of the mobile network. In the mobile network system, when data addressed to a terminal arrives at the home network, the home agent checks for the absence of a terminal managed by the home agent. When detecting the absence of the terminal in the home network, the home agent inquires of the mobile router in the mobile network whether or not the terminal is connected. Responding to this inquiry, the mobile router searches whether or not this terminal is connected to the own mobile network. If connected, the mobile router informs the home agent of the presence of this terminal. When receiving the notice, the home agent transfers data addressed to the terminal, to the mobile router as a notice source.

This process allows data addressed to a terminal to be always delivered accurately when the terminal connects to a home network or one of mobile networks. An inquiry from the home agent is transmitted to the mobile router only when the destination terminal is not connected to the home network, thereby reducing the traffic on the network. Further, the mobile router does not need to inform the home agent when a terminal is connected to the mobile network including the mobile router, thereby preventing the traffic between the home agent and the mobile router from being increased.

The terminal position managing method of the present invention further performs the next process. That is, a mobile router requests a home agent to allocate a network identifier, which is an identifier of the mobile network including the mobile router. Then, the home agent allocates a network identifier responding to the request. Next, the mobile router advertises the network identifier to its own mobile network. Then, the mobile router selects one network identifier from among those acquired from the home agent, with other mobile routers in the mobile network. This process is referred to as a network identifier selecting process. If a network identifier acquired by a mobile router from a home agent is different from that selected in the network identifier selecting process, that selected is registered in the home agent including the mobile router.

Even if plural mobile routers are connected to one mobile network, the process allows a home agent to acknowledge such a condition.

The terminal position managing method of the present invention further performs the next process. That is, when a home agent receives a notice of the presence of a terminal from plural mobile routers, the home agent selects one mobile router as a transfer destination from among the plural mobile routers that have sent the notice, or mobile routers with a network identifier registered same as that of the mobile routers that have sent the notice.

This process allows the home agent to select a mobile router conforming to the communication.

In the terminal position managing method of the present invention, either one of the plural mobile routers connecting to the same mobile network informs the home agent of the presence of the terminal, when a mobile router detects the presence of a terminal in searching whether or not its own mobile network for the terminal is connected thereto, in a case where plural mobile routers connect to one mobile network.

This process allows mobile routers in a mobile network to select a mobile router conforming to the communication in a coordinated fashion among them. If plural mobile routers detect the presence of a terminal, the traffic can be reduced as compared to the case where all the mobile routers send a notice.

In the terminal position managing method of the present invention, inquiry of the presence of a terminal in a home network is made using a data link layer address of a terminal. Meanwhile, detection of the absence of a terminal by a home agent is made as the following. That is, a home agent acquires an inquiry of the data link layer address of a terminal, and if no reply is made from the terminal within a given time after acquiring the inquiry, judgement is made that the terminal is not connected to the home network.

This process allows a home agent to acknowledge the absence of a terminal without adding a function to a device other than the home agent.

The terminal position managing method of the present invention further performs the next process. That is, after a mobile router detects that a terminal is connected to a mobile network including the mobile router, the mobile router periodically checks for connection of a terminal. When the mobile router becomes unable to acknowledge the connection of a terminal, the mobile router informs the home agent of the absence of a terminal.

This process allows a mobile router to promptly detect the absence of a terminal when a terminal is disconnected from the network, thereby preventing data from being transferred to a disconnected terminal.

A mobile router of the present invention is equipped with a message receiving unit, terminal searching unit, terminal position maintaining unit, and terminal position informing unit. The message receiving unit receives a message from an external network. When the message receiving unit receives an inquiry about the presence of a terminal specified by the home agent, the terminal searching unit checks for the presence of the terminal in the mobile network including the mobile router. After receiving a notice of detecting a terminal from the terminal searching unit, the terminal position maintaining unit requests the terminal searching unit to search for the presence of this terminal at given time intervals to manage terminal connection. Responding to a notice of disconnection of the terminal from the terminal position maintaining unit, the terminal position informing unit informs the home agent of the presence of this terminal; or responding to a notice of detecting the terminal from the terminal searching unit, the terminal position informing unit informs the home agent of the absence of this terminal.

This process allows a home agent to learn which mobile network has a terminal connected thereto. When the terminal is disconnected from the network, the home agent immediately receives the notice from the mobile router, thereby preventing data from being transferred to a terminal disconnected from the network.

The mobile router of the present invention is equipped with an identifier acquiring unit, identifier advertising unit, identifier sharing unit, and identifier updating unit. The identifier acquiring unit acquires a network identifier from a home agent. The identifier advertising unit advertises a network identifier acquired by the identifier acquiring unit, to within the mobile network, and receives a network identifier advertised from another mobile router. The identifier sharing unit selects either a network identifier advertised from another mobile router in the mobile network or the network identifier of the mobile router. If a network identifier selected by this identifier sharing unit is different from that acquired by the identifier acquiring unit, the identifier updating unit prohibits the identifier advertising unit from advertising, and also reregisters the network identifier selected, in the home agent. Then, if the network identifier reregistered is not advertised from another mobile router for a given time, the identifier updating unit updates the network identifier registered in the home agent to that acquired from the home agent.

This process allows a mobile router to share a network identifier with another mobile router connected to the same mobile network, thereby enabling the home agent to acknowledge that plural mobile routers are connected to the same mobile network. Accordingly, the home agent can transfer a packet addressed to a terminal selectively to a mobile router suitable to the communication.

In a case where a mobile router separates from a mobile network to form a new one and connects to another mobile network, the mobile router can share the network identifier of the mobile network as a connection destination to participate in the new mobile network. Accordingly, the mobile router can compose a mobile network flexibly.

A home agent of the present invention is equipped with a terminal absence detecting unit, terminal position searching unit, terminal position information managing unit, and data transferring unit. When receiving data addressed to a terminal, the terminal absence detecting unit detects for connection of the terminal to a home network. When this terminal absence detecting unit detects the absence of the terminal, the terminal position searching unit transmits a message for inquiring whether or not the terminal is connected to a mobile router connected to the mobile network managed by the home agent. Receiving a reply message to this inquiry, the terminal position information managing unit updates management information for a mobile network that the corresponding terminal connects to. The data transferring unit transfers data addressed to the corresponding terminal to a mobile router in the mobile network that the terminal connects to on the basis of management information in this terminal position information managing unit.

This process allows data addressed to a terminal to be always delivered accurately to a destination terminal when the terminal connects to a home network or either one of the mobile networks. Only when the destination terminal is not connected to a home network, an inquiry from the home agent is transmitted to the mobile router, thereby reducing the traffic on the network. Further, the mobile router does not need to inform a home agent when a terminal is connected to the mobile network including the mobile router, thereby preventing the traffic between the home agent and the mobile router from being increased.

A home agent of the present invention further includes an identifier allocating unit and an identifier registering unit. The identifier allocating unit allocates a network identifier, which is an identifier of a mobile network, according to a request from a mobile router. According to a request from a mobile router, the identifier registering unit registers the mobile router and the network identifier informed in connection with each other.

This process allows a home agent to acknowledge that plural mobile routers are connected to the same mobile network.

When the data transferring unit of a home agent of the present invention is informed by the identifier registering unit that a terminal is connected to a mobile network composed of plural mobile routers, the data transferring unit selects at least one from among the plural mobile routers and transfers it.

This process allows a home agent to select an appropriate mobile router to transfer data even if a terminal is connected to a mobile network that plural mobile router connect to.

The terminal absence detecting unit of a home agent of the present invention judges that a terminal is not connected to a home network if no reply is made from the terminal within a given time after acquiring an inquiry message for the data link layer address of the terminal in the home network.

This process allows a home agent to acknowledge the absence of a terminal without adding a function to a device other than the home agent.

The terminal position managing unit of a home agent of the present invention updates management information of a mobile network when receiving a notice of the absence of a terminal, from a mobile router.

This process prevents a home agent from accidentally transferring a packet to the previous network when a terminal moves to and from mobile networks and a home network.

Even when a terminal without routing function moves to another mobile network, the present invention thus enables a home agent to accurately detect a movement destination of the terminal and to transfer a packet addressed to the terminal.

BRIEF DESCRIPTION OF DRAWINGS

FIG. 14 shows the data structure of position management information in a mobile router, in the embodiment of the present invention.
FIG. 15A shows the data structure of identifier information in a mobile router, in the embodiment of the present invention.
FIG. 15B shows the data structure of identifier information in a mobile router, in the embodiment of the present invention.
FIG. 16A shows the data structure of home agent mobile network information, in the embodiment of the present invention.
FIG. 16B shows the data structure of home agent mobile network information, in the embodiment of the present invention.
FIG. 17 shows the data structure of home agent terminal position information, in the embodiment of the present invention.

REFERENCE MARKS IN THE DRAWINGS

Figure 1:
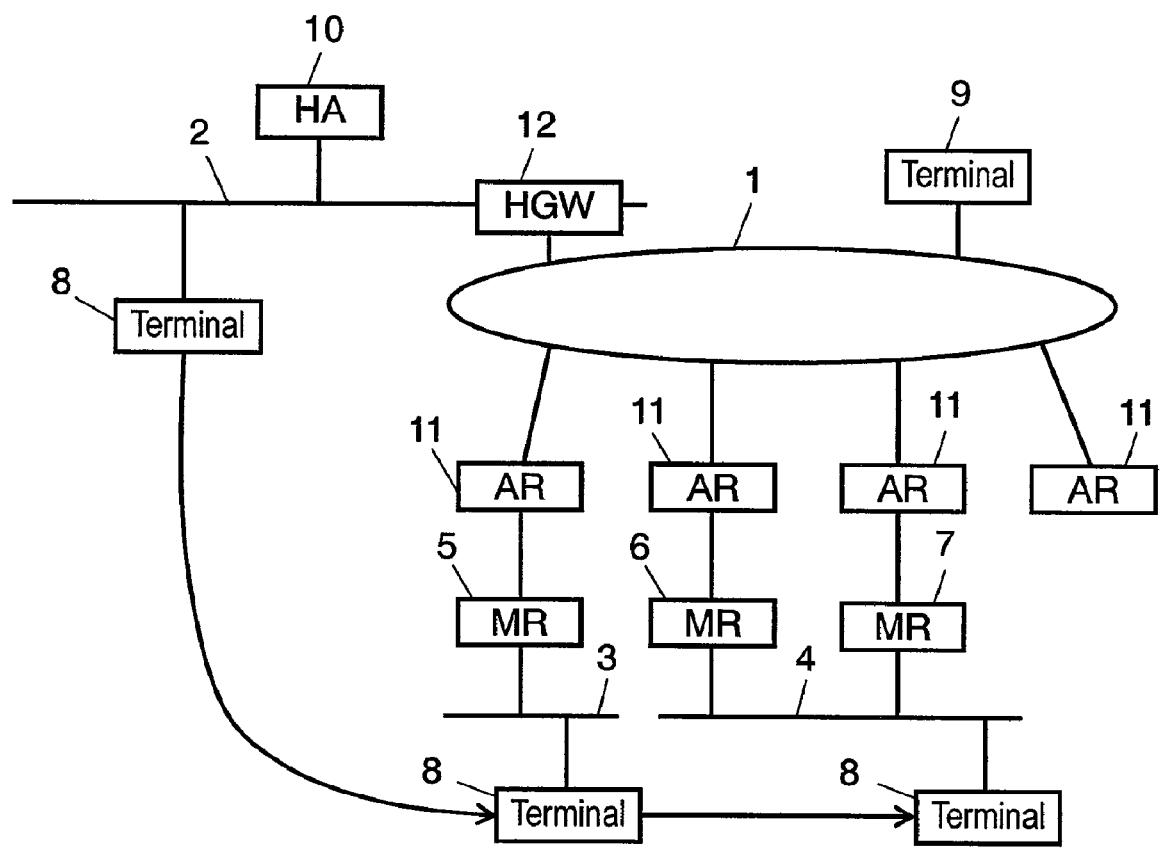
FIG. 1 is a block diagram of a mobile network system according to the embodiment of the present invention.

1 Global network
2 Home network 3, 4 Mobile network
5, 6, 7 Mobile router
8, 9 Terminal
10 Home agent
11 Access router
12 Home gateway
501 Internal network interface
502 Packet sending and receiving/relay processing unit
503 External network interface
504 Position registering unit
505 Terminal searching unit
506 Terminal position maintaining unit
507 Position management information storing unit
508 Terminal information storing unit
509 Identifier information storing unit
510 Terminal position informing unit
511 Identifier acquiring unit
512 Identifier advertising unit
513 Identifier sharing unit
514 Identifier updating unit
1001 Home network interface
1002 Packet sending and receiving/relay processing unit
1003 Terminal absence detecting unit
1004 Mobile network information managing unit
1005 Terminal position information managing unit
1006 Mobile network information storing unit
1007 Terminal position information storing unit
1008 Terminal position searching unit
1009 Identifier allocating unit
1010 Identifier registering unit

DETAILED DESCRIPTION OF PREFERRED EMBODIMENT

Hereinafter, a description is made for the embodiment of the present invention, with reference to the related drawings.

Exemplary Embodiment

FIG. 1 is a block diagram of a mobile network system according to the embodiment of the present invention. The mobile network system is different from a conventional one in that all of home network 2 and mobile networks 3, 4 have the same network prefix but different network identifiers (referred to as "NID" hereinafter) from one another. With the feature, terminal 8 does not need to reacquire an address whichever network terminal 8 connects to after moving alone, thereby allowing terminal 8 to continue communicating with another terminal 9 on the Internet. This NID is to specify a network, and a different NID enables a network with the same network prefix to be identified.

Hereinafter, a description is made for the makeup and operation of a mobile router and home agent, both composing a mobile network system in the embodiment, and for a method for managing a terminal position performed by using the mobile router and home agent.

First, the makeup and operation of a mobile router in the present invention is described.

Figure 2:
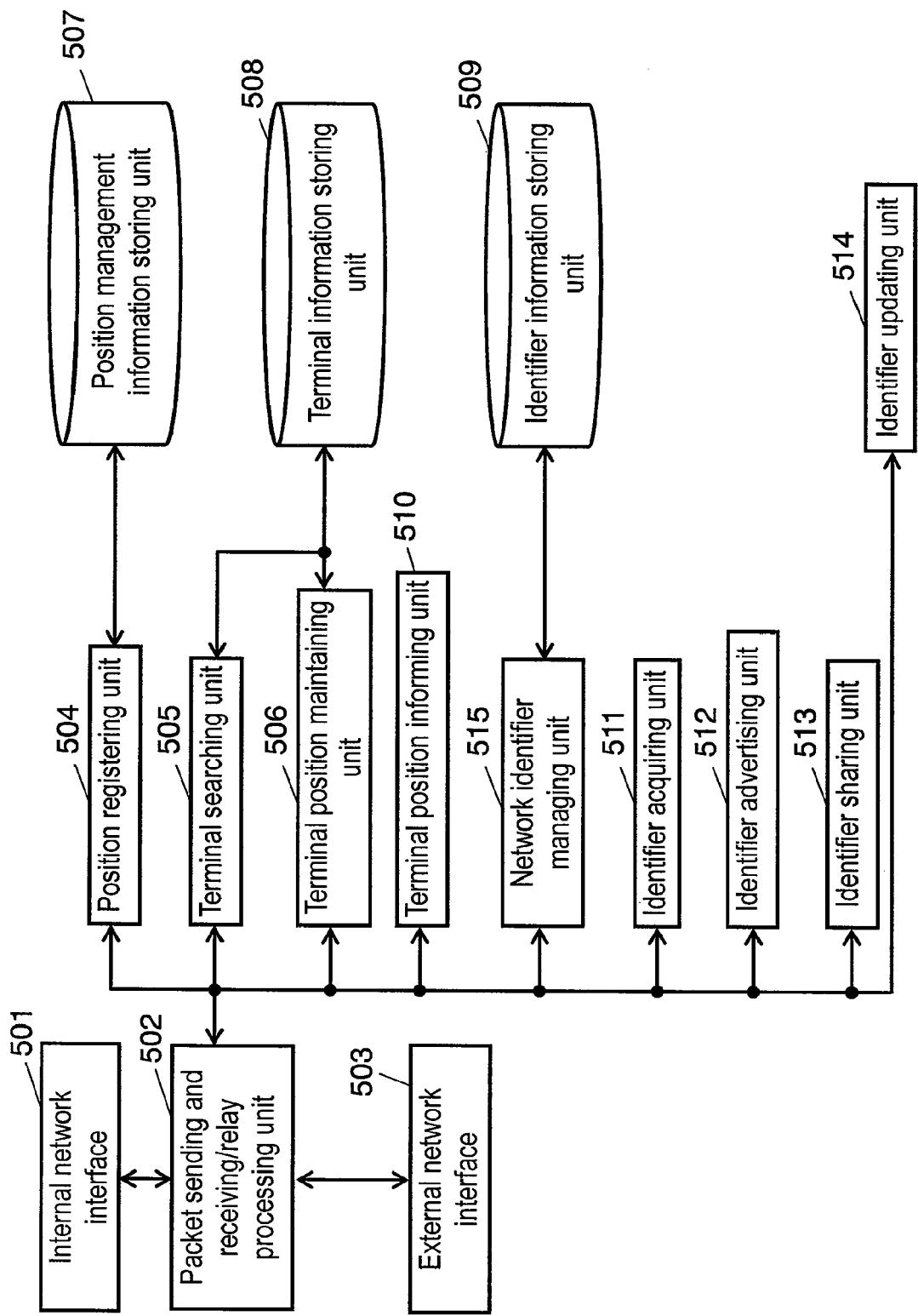
FIG. 2 is a block diagram of a mobile router according to the embodiment of the present invention.

FIG. 2 is a block diagram of mobile routers 5 through 7 in the present invention.

In FIG. 2, internal network interface 501 performs a physical layer process and a data link layer process in the communication with a terminal connected to a mobile network and with another mobile router. External network interface 503 performs a physical layer process and a data link layer process for connecting to access router 11, to be a point of connection with external network 1, a base station, an access point, and home network 2.

Packet sending and receiving/relay processing unit 502 performs processes for IP layer and upper layers (TCP, UDP, ICMP) higher than IP, when relaying or receiving a packet received from each interface, and when transmitting a packet from the mobile router itself. The message receiving unit according to the present invention corresponds to a part of the functions that packet sending and receiving/relay processing unit 502 has.

Position registering unit 504 acquires a CoA by acquiring network prefix information advertised by access router 11, registers a position entry in home agent 10, and saves position management information in position management information storing unit 507. FIG. 14 shows the data structure of position management information stored in position management information storing unit 507.

In FIG. 14, HA 1701 is the address of a home agent including the mobile router; HoA 1702, the home address of the mobile router; and CoA 1703, the care-of address of the current position.

Terminal searching unit 505 searches whether or not a specified terminal is connected to the mobile network, which is an internal network, and if connected, registers the terminal in terminal information storing unit 508.

Terminal position maintaining unit 506 manages the location of a terminal in the mobile network including the mobile router, and when the position of the terminal changes, updates the entry information in terminal information storing unit 508.

Responding to a notice from terminal searching unit 505 and terminal position maintaining unit 506, terminal position informing unit 510 generates a terminal position managing message for informing the location of a specified terminal.

Figure 18:
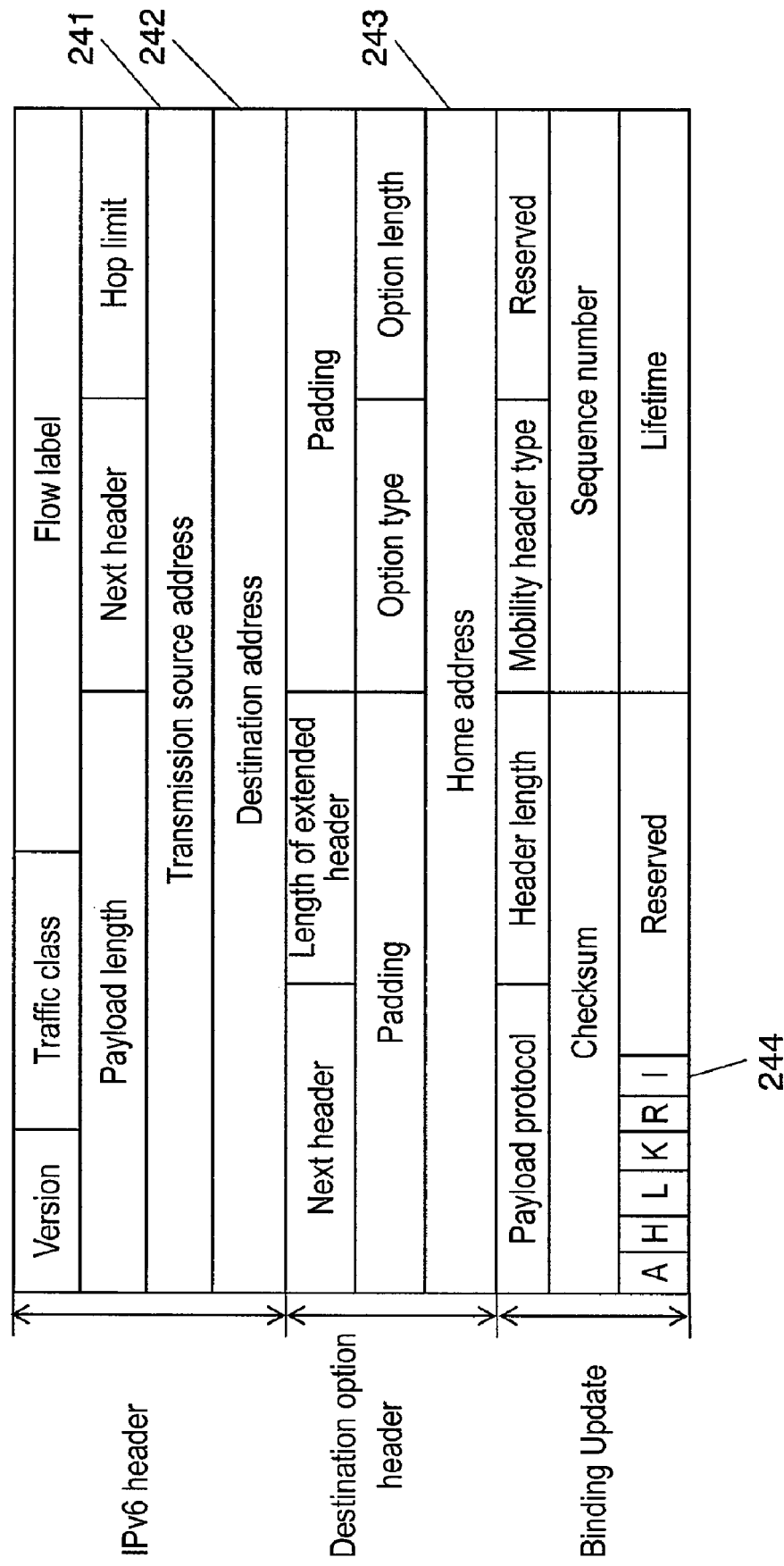
FIG. 18 is a format diagram of an NID allocation request packet in a mobile network according to the embodiment of the present invention.

Identifier acquiring unit 511 generates an NID allocation request message for requesting home agent 10 to allocate an NID. The packet format of the NID allocation request message is shown in FIG. 18. The packet is a Binding Update (referred to as "BU" hereinafter) packet in Mobile IPv6, where the CoA of the mobile router is set to transmission source address 241; the address of a home agent, to destination address 242; and the HoA of this mobile router, to home address 243. I flag 244 indicates an allocation request for an NID, where '1' is set to request allocation; '0', not to request.

Figure 21:
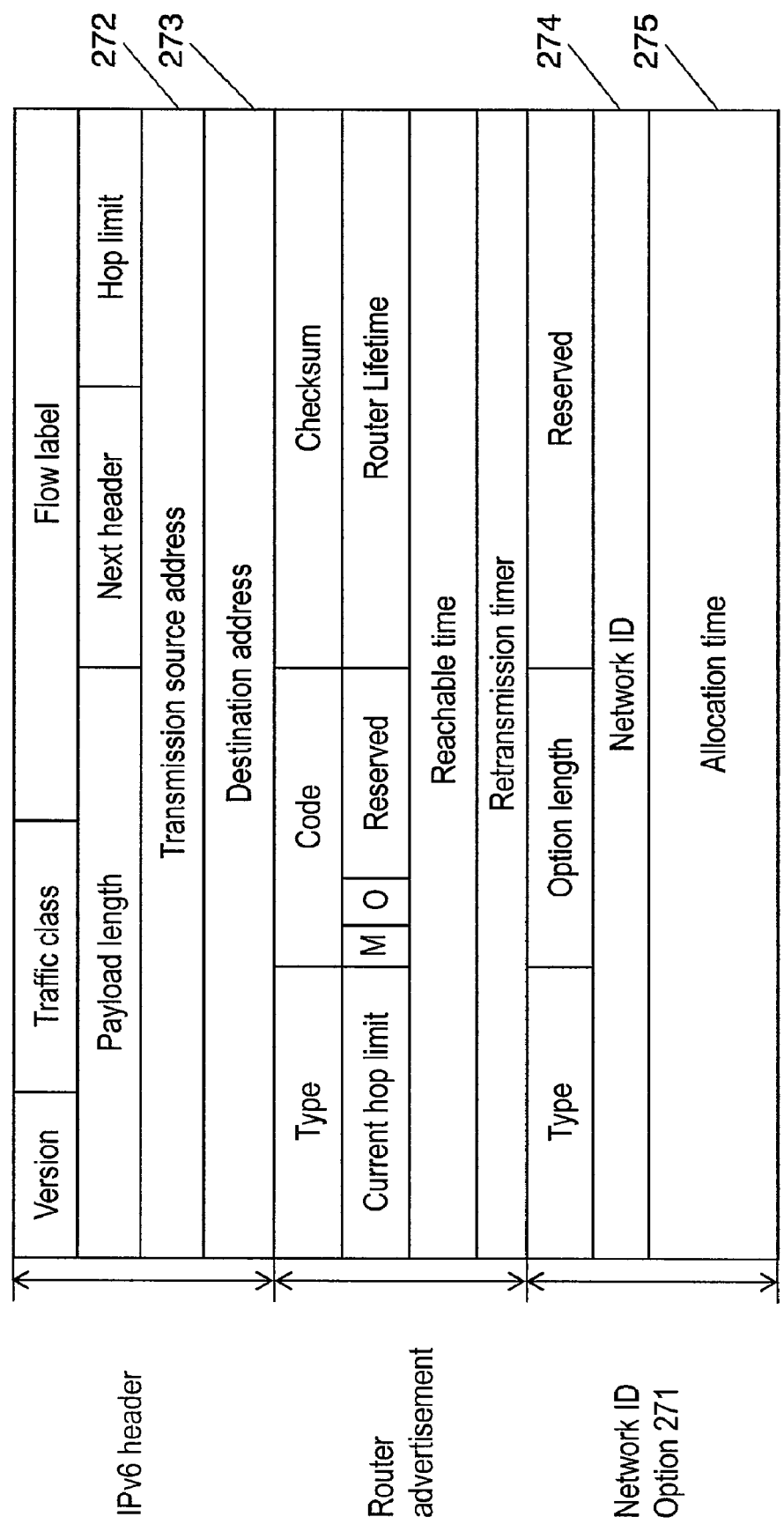
FIG. 21 is a format diagram of an NID advertising packet in a mobile network according to the embodiment of the present invention.

Identifier advertising unit 512 generates an NID advertising message for informing the own internal network of an NID. The packet format of the NID advertising message is shown in FIG. 21. The packet is formed by adding network ID option 271 to a Router Advertisement (referred to as "RA" hereinafter) packet in ICMPv6. The local scope address of a transmission source router is set to transmission source address 272; the multicast address addressed to all the nodes in the network, to destination address 273. The self NID is described in network ID 274 of network ID option 271. The time point at which the NID was allocated by home agent 10 is described in allocation time 275. Identifier advertising unit 512 has a function of receiving an NID from another mobile router in the same mobile network, as well.

In a case where plural mobile routers are connected to one mobile network, and respective mobile routers have acquired different NIDs, identifier sharing unit 513 selects either one of the NIDs as its own NID. In this embodiment, an NID is assumed to be selected that has the oldest allocation time point, as a selection criterion, but not limited. Sequence numbers separately set by the home agent or another criterion can be used.

Figure 20:
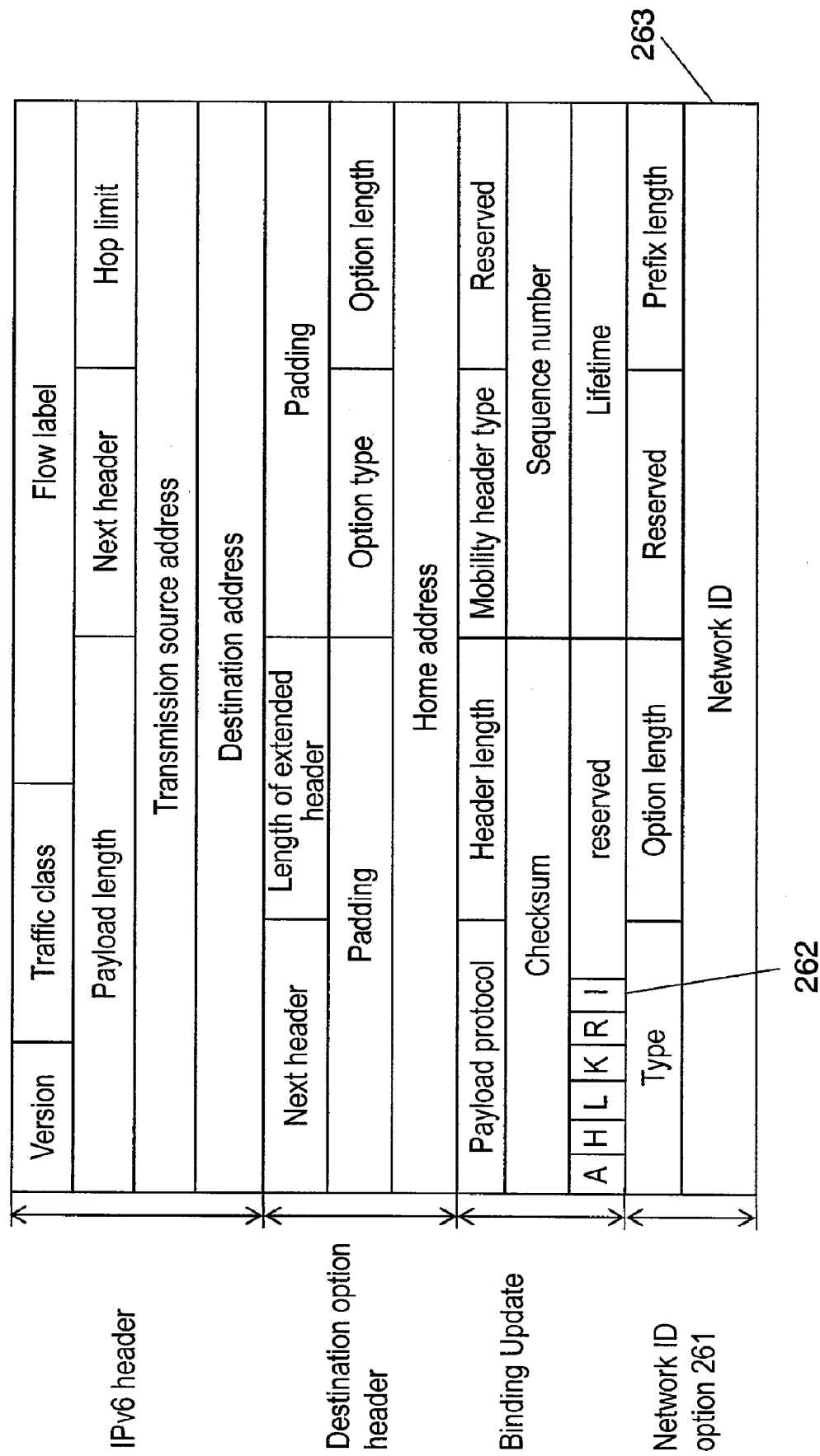
FIG. 20 is a format diagram of an NID update request packet in a mobile network according to the embodiment of the present invention.

Identifier updating unit 514 generates an NID update request message for requesting home agent 10 to update an NID. The packet format of the NID update request message is shown in FIG. 20. The packet is formed by newly adding network ID option 261 to a BU packet in Mobile IPv6. Network ID 263 included in this network ID option 261 indicates an NID to be newly registered. To I flag 262, '1' is set to request updating; '0', not to request.

Network identifier managing unit 515 saves the NID of a mobile network that the mobile router connects to, in identifier information storing unit 509 and manages the NID. FIG. 15A shows the data structure of identifier information recorded in identifier information storing unit 509.

In FIG. 15A, NID 1801 indicates an NID allocated to the own mobile network; transmission source 1802, a transmission source that has informed of the NID; and allocation time 1803, the time point at which the home agent allocated the NID. To transmission source 1802, '1' is set if the transmission source is a HA; '0', otherwise.

A description is made for communication operation of a mobile router with the above-described makeup, of the present invention, using the related drawings.

Figure 9:
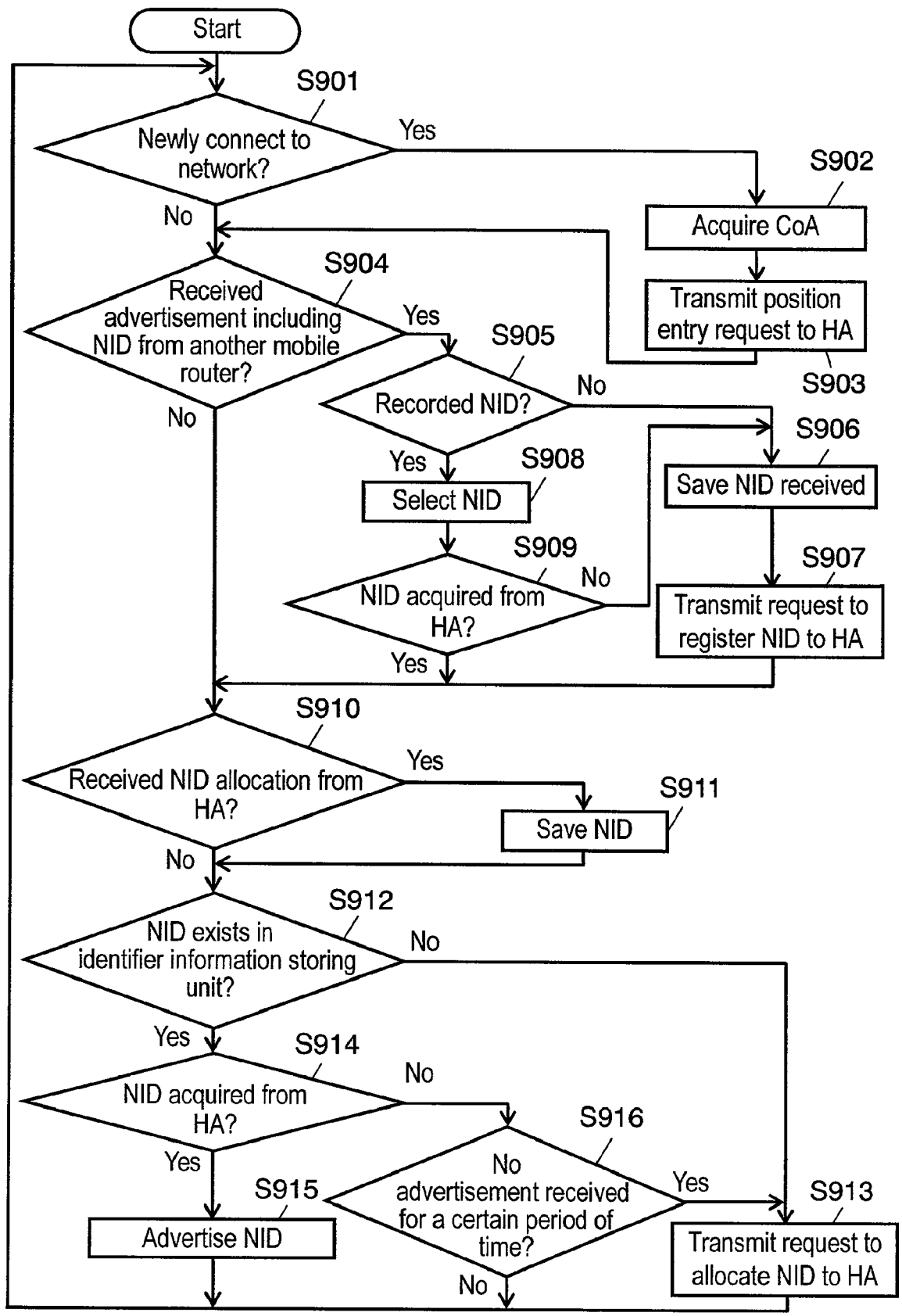
FIG. 9 is a flowchart illustrating the NID registering process performed by a mobile router according to the embodiment of the present invention.

FIG. 9 is a flowchart illustrating the position registering process and NID registering process of the mobile router.

First, when external network interface 503 connects to access router 11 or home network 2 (step S901), position registering unit 504 is informed of the event through packet sending and receiving/relay processing unit 502. Position registering unit 504 acquires a CoA from access router 11 and saves it in position management information storing unit 507 (step S902).

Next, position registering unit 504 generates a BU message for informing home agent 10 of the own HoA and CoA, and requests packet sending and receiving/relay processing unit 502 to transmit the message to home agent 10. Responding to this request, unit 502 transmits the BU message to home agent 10 through external network interface 503 (step S903).

Next, when packet sending and receiving/relay processing unit 502 receives an NID advertising packet shown in FIG. 21 from another mobile router through external network interface 503 (step S904), network identifier managing unit 515 checks whether or not an NID has already been recorded in identifier information storing unit 509 (step S905). If not recorded, unit 515 extracts an NID, the transmission source address of the NID advertising packet, and allocation time from network ID field 274 of the NID advertising packet, transmission source address field 272, and allocation time field 275, respectively, and records each of them in NID 1801 in identifier information storing unit 509, transmission source 1802, and allocation time 1803, respectively (step S906).

Next, network identifier managing unit 515 directs identifier updating unit 514 to request home agent 10 to update the NID. Responding to this direction, unit 514 generates an NID update request message, and requests packet sending and receiving/relay processing unit 502 to transmit an NID request message to home agent 10. Responding to this request, unit 502 transmits the NID request message to home agent 10 through external network interface 503 (step S907).

In step S905, if an NID has already been recorded, identifier sharing unit 513 determines an NID uniquely on the basis of the above-described selection criterion (step S908). Then, network identifier managing unit 515 checks whether or not the NID selected has been acquired directly from home agent 10 (step S909), and if acquired from home agent 10, nothing is done and the process flow proceeds to the next step; otherwise, to step S906.

Next, when packet sending and receiving/relay processing unit 502 receives an allocation informing packet from home agent 10 through external network interface 503, unit 502 informs network identifier managing unit 515 of the NID received (step S910).

Figure 19:
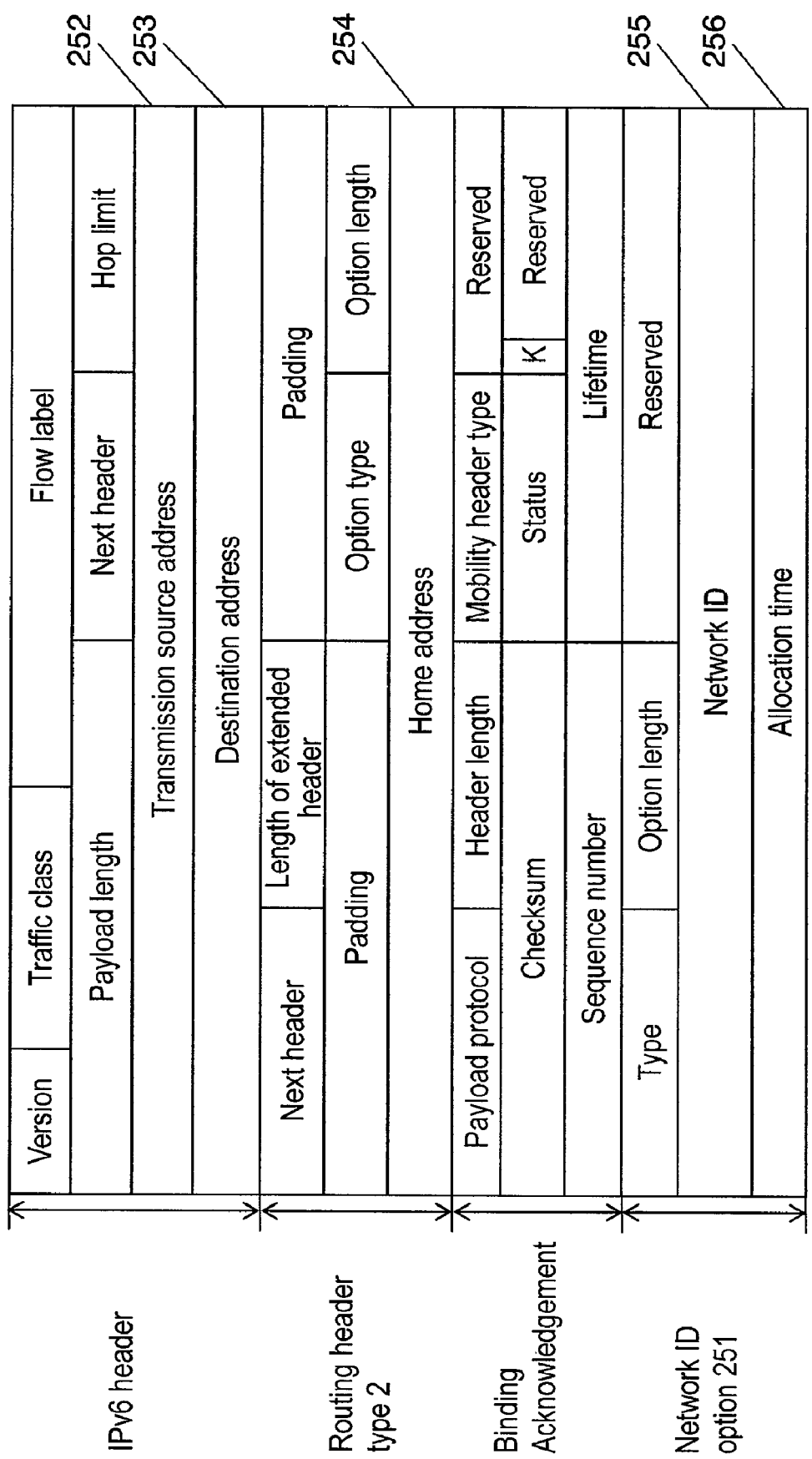
FIG. 19 is a format diagram of an NID allocation informing packet in a home agent according to the embodiment of the present invention.

FIG. 19 shows the format of an NID allocation informing packet. This packet is formed by adding network ID option 251 to a Binding Acknowledgement (BA) packet, meaning an acknowledgement reply to a BU packet. The address of home agent 10, the CoA, and the HoA, of a mobile router are set to transmission source address 252, destination address 253, and home address 254, respectively. Further, an NID allocated by home agent 10 is set to network ID 255, and the time point (referred to as "NID allocation time" hereinafter) at which the NID was allocated is set to allocation time 256.

Here, network ID option 251 does not need to be this format as long as network ID 255 can be set. NID allocation time is used as a selection criterion in this embodiment, but others such as allocation numbers may be used.

Next, network identifier managing unit 515 saves an NID informed as that of the own mobile network, in identifier information storing unit 509 (step S911). In the identifier information recorded at this moment, as shown in FIG. 15A, a value (assumed to be '3' here) informed through network ID 255 is set to NID field 1801; '1' indicating being directly allocated by home agent 10, to transmission source 1802; and data in allocation time field 256 of the allocation informing packet, to allocation time 1803.

Next, network identifier managing unit 515 checks whether or not an NID is recorded in identifier information storing unit 509 (step S912), and if not recorded, directs identifier acquiring unit 511 to acquire an NID. Unit 511 generates an NID allocation request message, and requests packet sending and receiving/relay processing unit 502 to transmit the message to the home agent. Responding to the request, unit 502 transmits an NID allocation request packet to the home agent through external network interface 503 (step S913).

Meanwhile, if an NID is recorded, network identifier managing unit 515 judges whether or not the NID has been allocated directly by home agent 10 (transmission source 1802 in FIG. 15A is '1') (step S914). If acquired from home agent 10, unit 515 directs identifier advertising unit 512 to advertise the NID to the internal network. Identifier advertising unit 512 generates an NID advertising message, and requests packet sending and receiving/relay processing unit 502 to advertise the message to all the mobile routers in the internal network. Responding to this request, unit 502 performs multicast transmission of the NID advertising message through internal network interface 501 (step S915).

Meanwhile, if the NID is not what allocated directly by home agent 10, network identifier managing unit 515 checks for a given time whether or not a new NID advertising packet has been received from a mobile router recorded as a transmission source of the NID (step S916). If not received, unit 515 requests home agent 10 to allocate an NID.

Next, a description is made for the terminal position search process of a mobile router according the present invention, using the related drawings.

Figure 7:
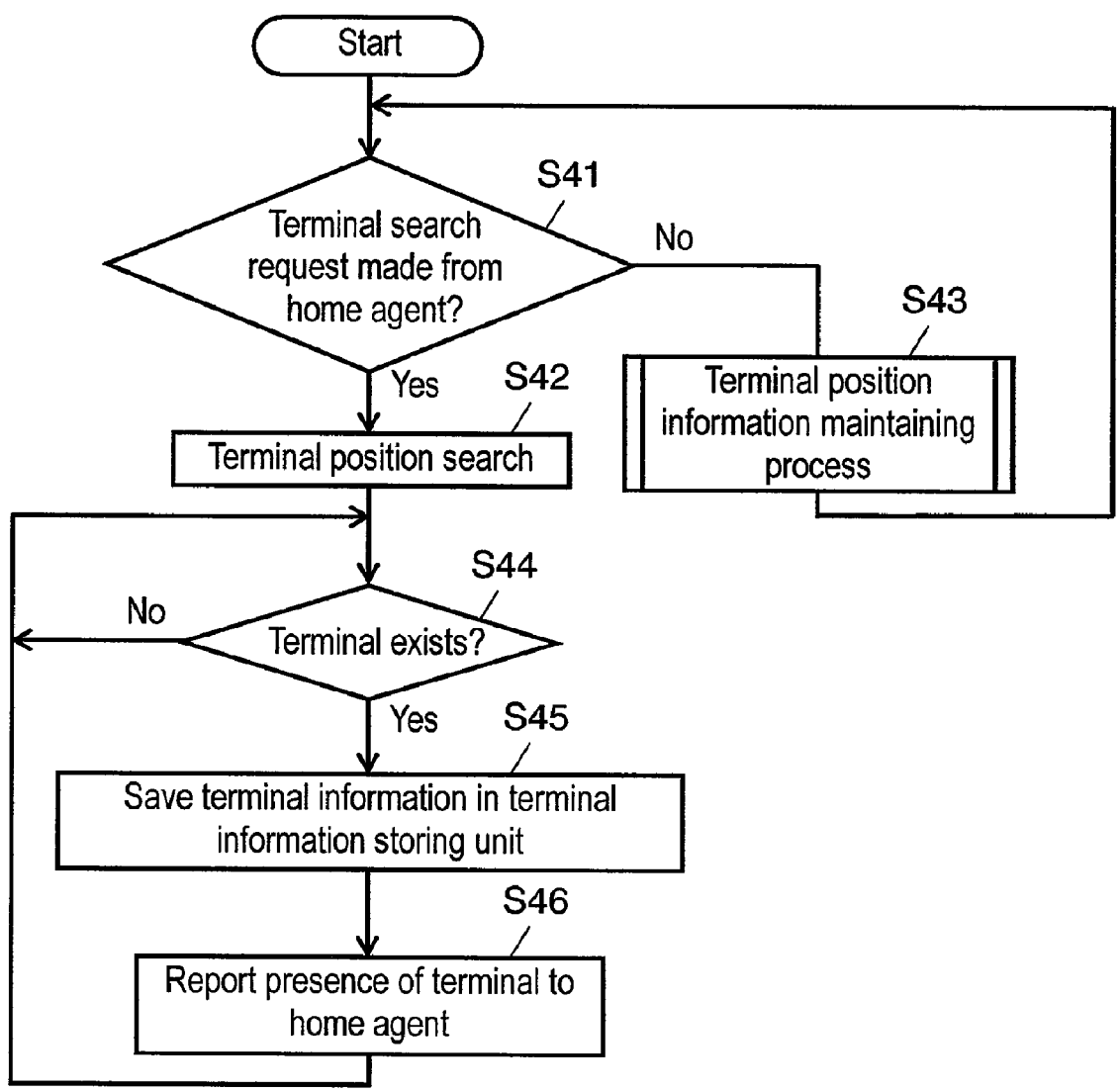
FIG. 7 is a flowchart illustrating the terminal position search process performed by a mobile router according to the embodiment of the present invention.

FIG. 7 is a flowchart illustrating the terminal position search process.

First, when packet sending and receiving/relay processing unit 502 receives a terminal search request packet from home agent 10 through external network interface 503 (step S41), unit 502 informs terminal searching unit 505. Responding to the notice, terminal searching unit 505 searches whether or not a terminal specified through the terminal search request packet exists in the internal network (step S42), and if not existing, the process flow returns to step S41 (step S44).

If existing (step S44), network identifier managing unit 515 saves the terminal address in terminal information storing unit 508 (step S45) and also reports the presence of the terminal to terminal position maintaining unit 506.

Next, terminal position maintaining unit 506 directs terminal position informing unit 510 to report the presence of a corresponding terminal to home agent 10. Responding to the direction, unit 510 creates a terminal position managing message with an NID described therein, and transmits the message from external network interface 503 to home agent 10 through packet sending and receiving/relay processing unit 502 (step S46). Here, terminal position informing unit 510 can not create this terminal position managing message if the NID has been advertised from another mobile router. This arrangement results in the following. That is, if plural mobile routers exist in the same mobile network, a home agent is informed by only a mobile router with its own NID selected as that of its mobile network, thereby reducing the traffic as compared to a case where all the mobile routers inform.

In step S41, if packet sending and receiving/relay processing unit 502 has not received a terminal search request from home agent 10 (step S41: No), the terminal position information maintaining process is performed (step S43). The terminal position information maintaining process is described later.

Hereinafter, a description is made for the format of a terminal search request packet from home agent 10 and that of a terminal position managing packet for reporting the presence of a terminal to home agent 10.

Figure 22:
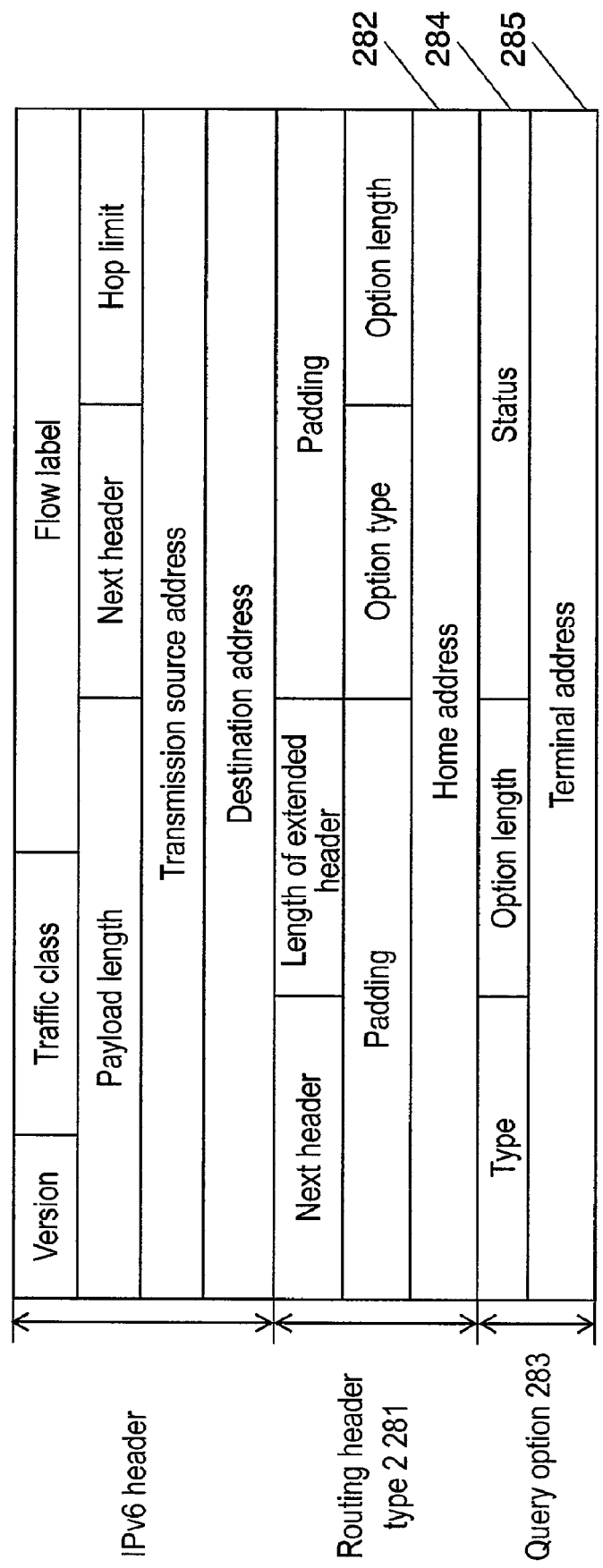
FIG. 22 is a format diagram of a terminal search request packet in a home agent according to the embodiment of the present invention.

FIG. 22 shows the format of a terminal search request packet. In FIG. 22, home address 282 of routing header type 2 (281) indicates the home address of a transmission-destination mobile router, and terminal address 285 of query option 283 indicates the address of a search-target terminal. Status 284 indicates which process out of "search", "found", "error", or "ACK" described below, the relevant packet intends.

More specifically, "search" of status 284 indicates that home agent 10 is requesting terminal position search; "found", the mobile router that has received "search" has performed the terminal position search process (step S42) and has found a terminal. "Missed" indicates that the absence of the terminal has been acknowledged during the terminal position information maintaining process (step S43) after finding the terminal with "found"; "ACK" (acknowledgement), a reply to the receipt of the request.

Figure 23:
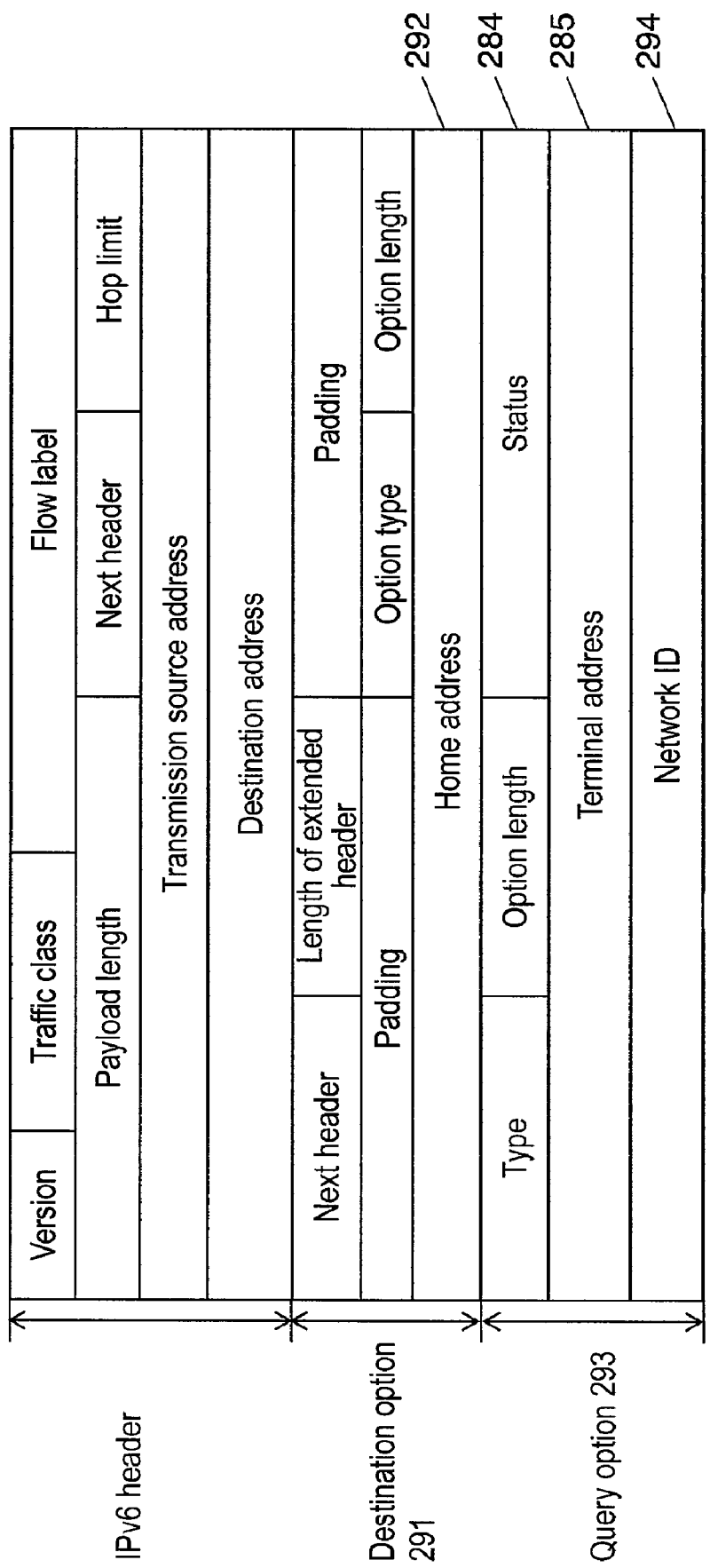
FIG. 23 is a format diagram of a terminal position managing packet in a mobile network according to the embodiment of the present invention.
Figure 24:
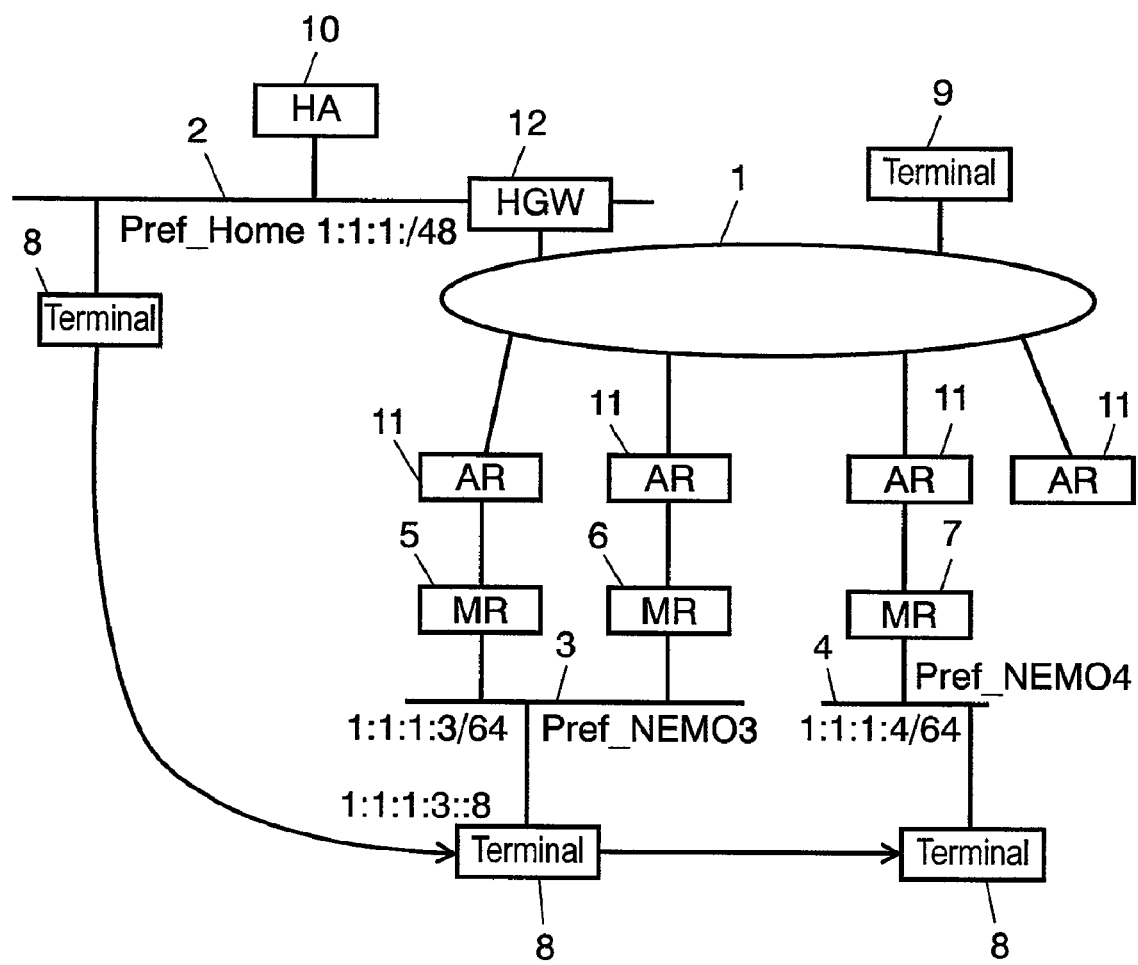
FIG. 24 is a block diagram of a conventional mobile network system.

FIG. 23 shows the format of a terminal position managing packet.

In FIG. 23, home address 292 of destination option 291 includes the HoA of a transmission-source mobile router; query option 293, network ID 294 in addition to terminal address 285.

For IPv6, in the above-described terminal position search process (step S42), a mobile router advertises Neighbor Solicitation (NS): inquiry about a data link layer (referred to as "L2" hereinafter) address corresponding to an IPv6 address) in ICMPv6 Neighbor Discovery (ND) protocol, in the mobile network. Then, terminal searching unit 505 judges whether or not a terminal exists by detecting whether or not Neighbor Advertisement (NA): a reply to an NS returns from a terminal. For IPv4, ARP (Address Resolution Protocol) is used.

Figure 8:
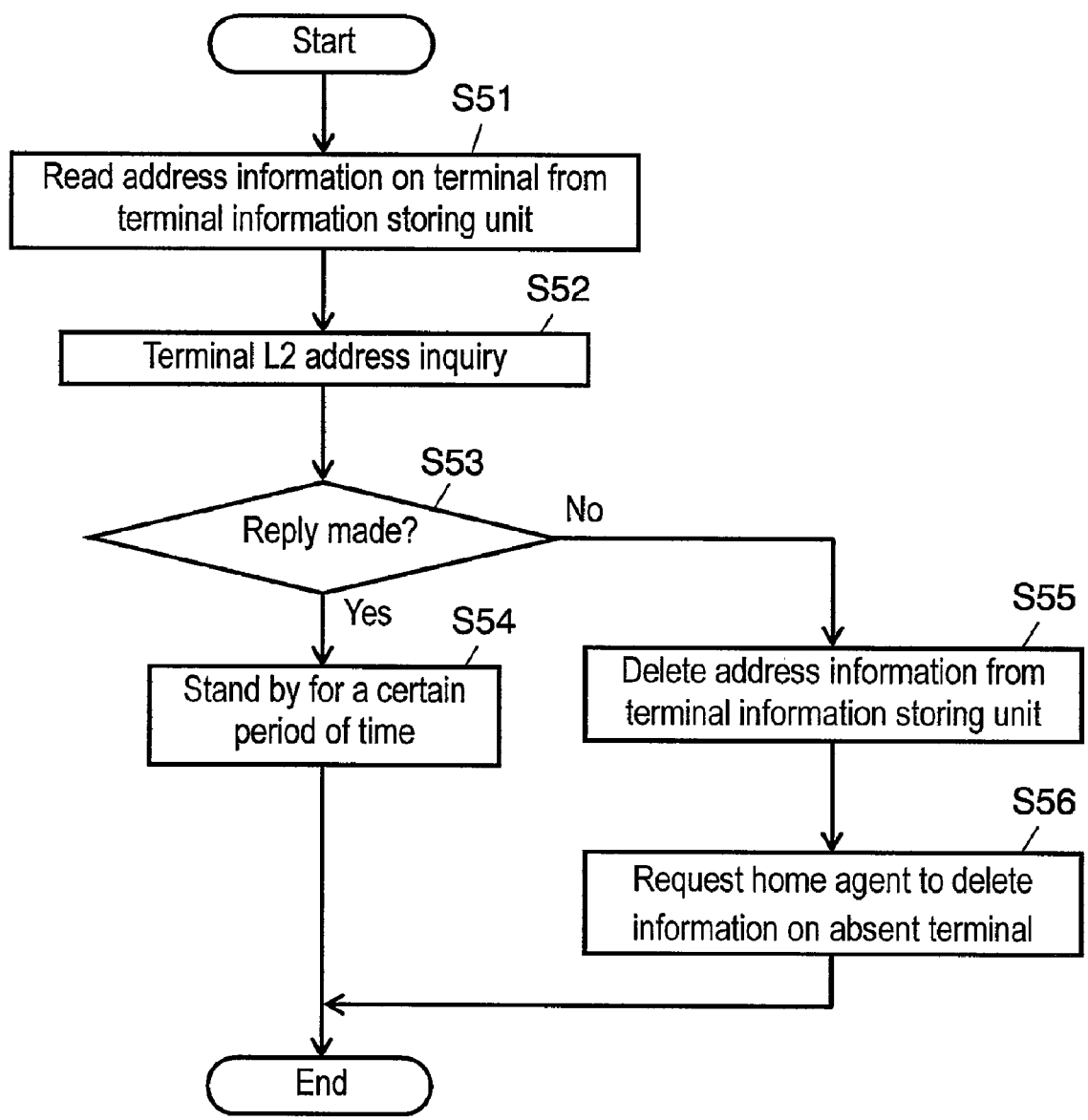
FIG. 8 is a flowchart illustrating the terminal position information maintaining process performed by a mobile router according to the embodiment of the present invention.

Next, a description is made for details about the above-described terminal position information maintaining process (step S43), using FIG. 8.

In FIG. 8, terminal position maintaining unit 506 reads address information on a terminal, recorded in terminal information storing unit 508 and directs terminal searching unit 505 to search whether or not the terminal with its address having been read is connected to a mobile network (step S51). Terminal searching unit 505 inquires the L2 address of the terminal (step S52) in the same way as the terminal position search process (step S42). If a reply is made from the terminal specified (step S53), terminal position maintaining unit 506 ends the process after standing by for a certain period of time (step S54).

Meanwhile, if a reply is not made from the terminal specified (step S53), terminal position maintaining unit 506 deletes the address information on the corresponding terminal from terminal information storing unit 508 (step S5), and directs terminal position informing unit 510 to transmit a packet for requesting to delete the entry of the relevant terminal to home agent 10. Responding to this direction, unit 510 sets "error" to status 284 of query option 293, and sets the address of the corresponding terminal to terminal address 285, to generate a terminal position managing message. Then, terminal position informing unit 510 transmits the terminal position managing message from external network interface 503 to the home agent through packet sending and receiving/relay processing unit 502 (step S56).

As described above, mobile routers 5, 6, 7 according to the present invention search for terminal 8 upon receiving an inquiry about the location of terminal 8 from home agent 10, and if finding it, immediately reports to home agent 10. When relevant terminal 8 leaves the mobile network, the mobile router according to the present invention immediately reports to home agent 10. This process allows home agent 10 to learn the position of terminal 8, namely a mobile network in connection, when required.

Next, a description is made for the makeup and operation of home agent 10 according to the present invention.

Figure 3:
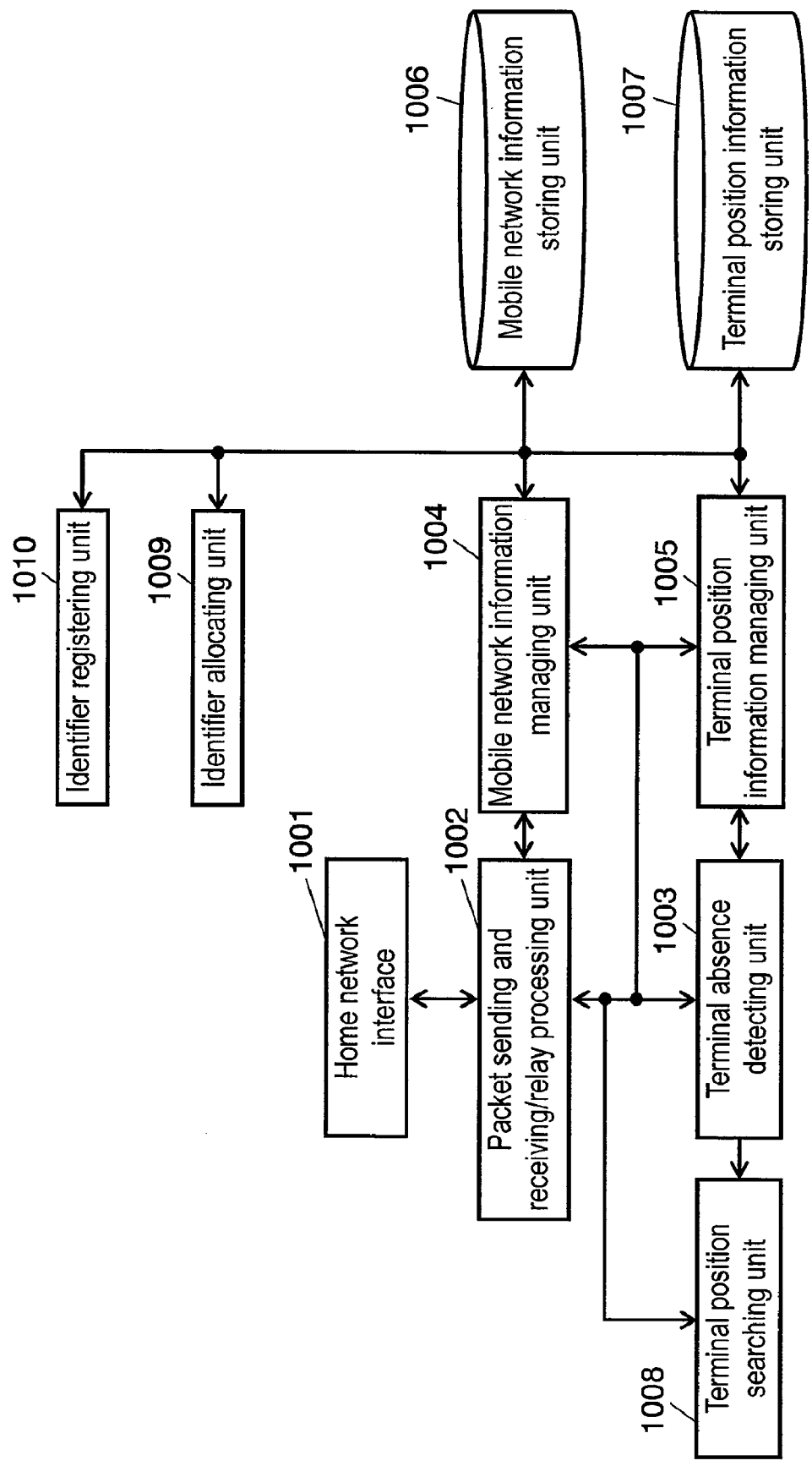
FIG. 3 is a block diagram of a home agent according to the embodiment of the present invention.

FIG. 3 is a block diagram of home agent 10 according to the embodiment.

In FIG. 3, home network interface 1001 connects to home network 2 to perform a physical layer process and a data link layer process. Packet sending and receiving/relay processing unit 1002 sends and receives a packet, and relays a packet to a mobile network. This unit 1002 corresponds to the data transferring unit according to the present invention.

Terminal absence detecting unit 1003 detects the absence of a specified terminal in the home network.

Terminal position searching unit 1008 generates a terminal search request message for learning the location of a specific terminal.

Terminal position information managing unit 1005 saves position information of a terminal informed in terminal position information storing unit 1007 and manages the information.

FIG. 17 shows the data structure of terminal position information, where terminal address 2301 indicates the address of a terminal that has received a notice; NID 2302, the NID of a network that the relevant terminal connects to.

Mobile network information managing unit 1004 saves information related to a network that a mobile router registered connects to, in mobile network information storing unit 1006 and manages the information. FIG. 16A shows the data structure of this mobile network information.

In FIG. 16A, HoA 2101 indicates the HoA of a mobile router; CoA 2102, the CoA of the mobile router; and NID 2103, the NID of a mobile network that the mobile router connects to.

Identifier allocating unit 1009 allocates an NID to the mobile network informed by the mobile router. Identifier registering unit 1010, by being requested to update the NID, updates the NID recorded in mobile network information storing unit 1006.

Figure 11:
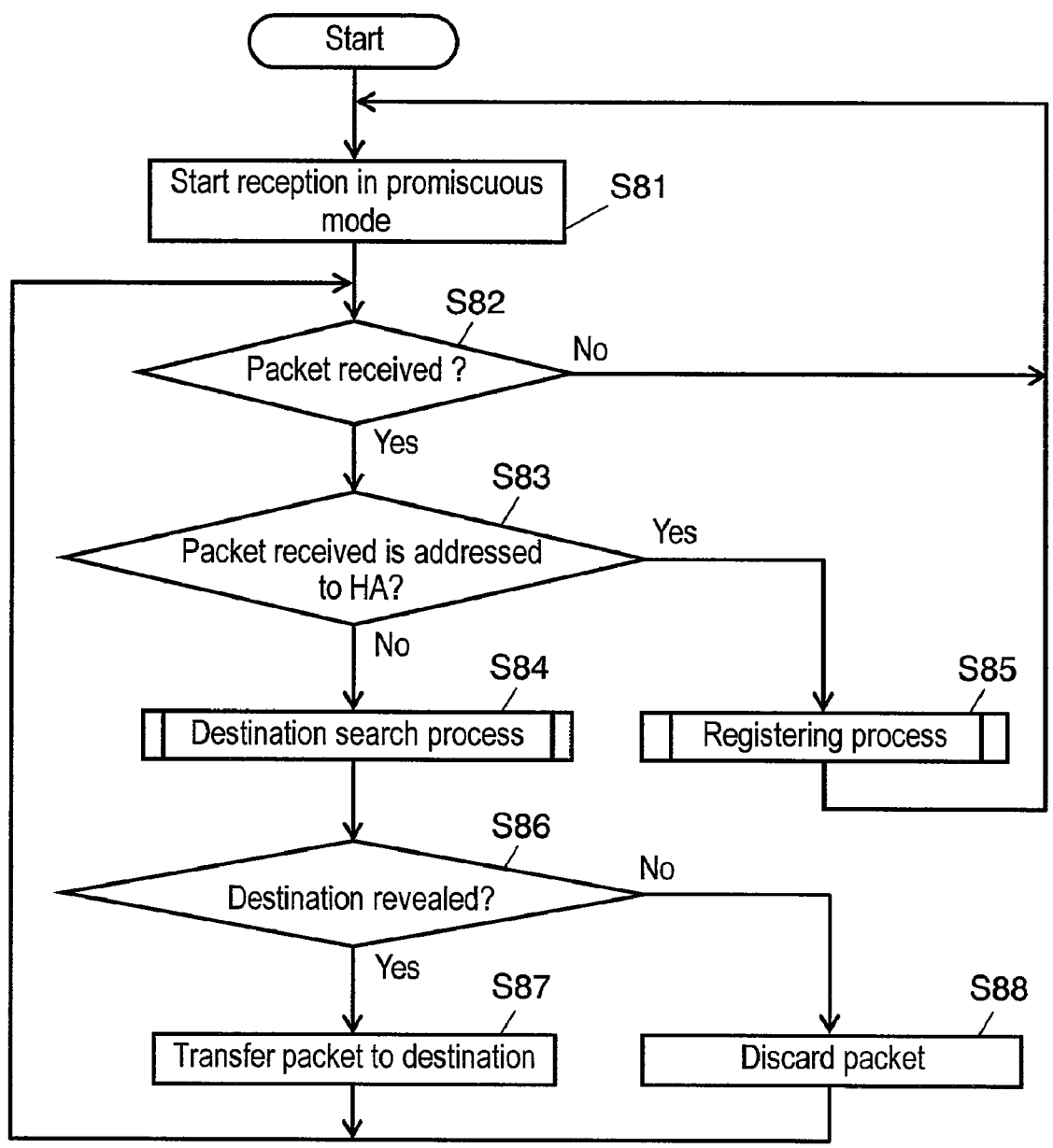
FIG. 11 is a flowchart illustrating the packet sending and receiving/relay process performed by a home agent according to the embodiment of the present invention.

Next, a description is made for the packet sending and receiving/relay process of a home agent of the present invention, using FIG. 11.

FIG. 11 is a flowchart illustrating the packet sending and receiving/relay process of packet sending and receiving/relay processing unit 1002.

First, home network interface 1001 starts receiving a packet in promiscuous mode (step S81). Usually, only a packet addressed to the L2 address of home network interface 1001 is sent to packet sending and receiving/relay processing unit 1002; setting to this promiscuous mode allows home network interface 1001 to send all the packets received, regardless of the own L2 address, to packet sending and receiving/relay processing unit 1002.

After that, when receiving a packet (step S82), packet sending and receiving/relay processing unit 1002 judges whether or not the packet received is that addressed to the home agent itself (step S83), and if addressed to the self, requests mobile network information managing unit 1004 to perform a registering process (step S85).

Meanwhile, if the packet received is not addressed to the self (step S83), packet sending and receiving/relay processing unit 1002 inquires of mobile network information managing unit 1004 about a transfer destination. Responding to this inquiry, mobile network information managing unit 1004 searches for the address of a transfer destination (step S84).

Next, when the address of a transfer destination is found (step S86), packet sending and receiving/relay processing unit 1002 encapsulates the packet as required and transfers it to the destination informed (step S87).

If not found (step S86), unit 1002 discards the packet (step S88).

Figure 10:
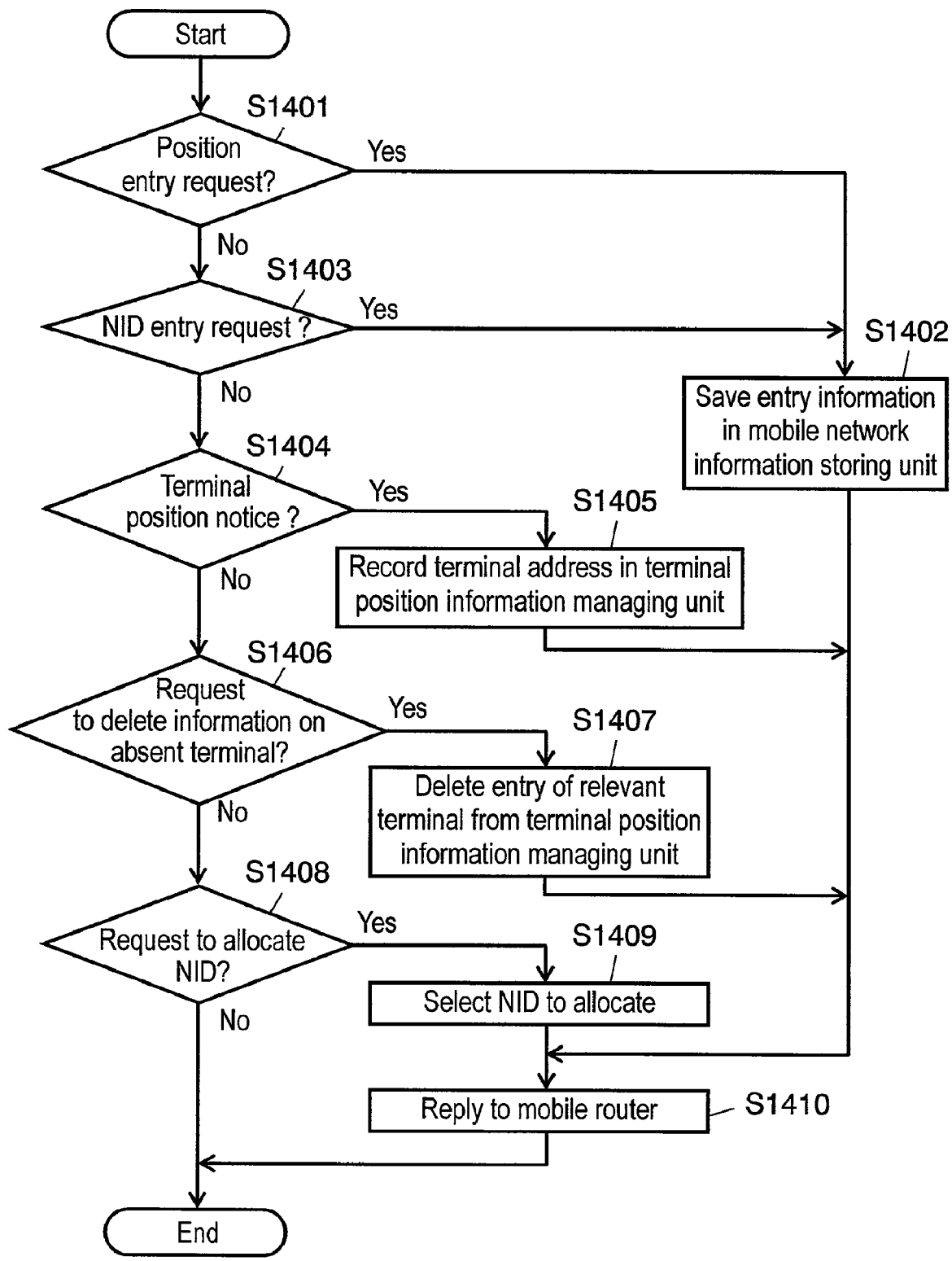
FIG. 10 is a flowchart illustrating the registering process performed by a home agent according to the embodiment of the present invention.

Here, a description is made for the registering process in step S85, using FIG. 10.

FIG. 10 is a flowchart illustrating the registering process.

First, mobile network information managing unit 1004 checks the type of a packet received. If the packet is a BU packet, namely a position entry request, from a mobile router (step S1401), unit 1004 registers the HoA and CoA informed to unit 1004, in connection with each other, in HoA 2101 and CoA 2102 of mobile network information storing unit 1006 (step S1402). Then, unit 1004 transmits a usual BA packet to the transmission-source mobile router (step S1410).

If a packet received is an NID update request packet from mobile routers 5, 6, 7 (step S1403), identifier registering unit 1010 updates NID 2103 registered by a mobile router as a transmission source, recorded in mobile network information storing unit 1006, to the NID described in network ID 263 of the NID update request packet (step S1402). Then, mobile network information managing unit 1004 transmits a usual BA packet to the transmission-source mobile router (step S1410).

If the packet received is a terminal position managing packet from mobile routers 5, 6, 7, terminal position information managing unit 1005 is informed. Terminal position information managing unit 1005 checks status 284 of query option 293, and if status 284 is "found" (step S1404), terminal address 285 and network ID 294 informed are recorded in terminal address 2301 and NID 2302 in terminal position information storing unit 1007, respectively (step S1405).

After that, terminal position information managing unit 1005 sets ACK to status 284 in the terminal search request packet and transmits it (step S1410).

If status 284 is "missed" (step S1406), terminal position information managing unit 1005 deletes the record of a terminal with terminal address 285 informed, from terminal position information storing unit 1007 (step S1407). After that, terminal position information managing unit 1005 sets ACK to status 284 in the terminal search request packet and transmits it (step S1410).

If the packet received is an NID allocation request packet from mobile routers 5, 6, 7 (step S1408), identifier allocating unit 1009 selects an NID not overlapping with an NID already allocated, to generate an NID allocation notice message. At this moment, unit 1009 sets the NID selected to network ID 255 and also describes the current time point in allocation time 256. After that, packet sending and receiving/relay processing unit 1002 transmits the packet to a mobile router as the request source through home network interface 1001 (step S1410).

Next, a description is made for the process of searching for the address of a transfer destination in step S84 described above, using FIG. 13.

Figure 13:
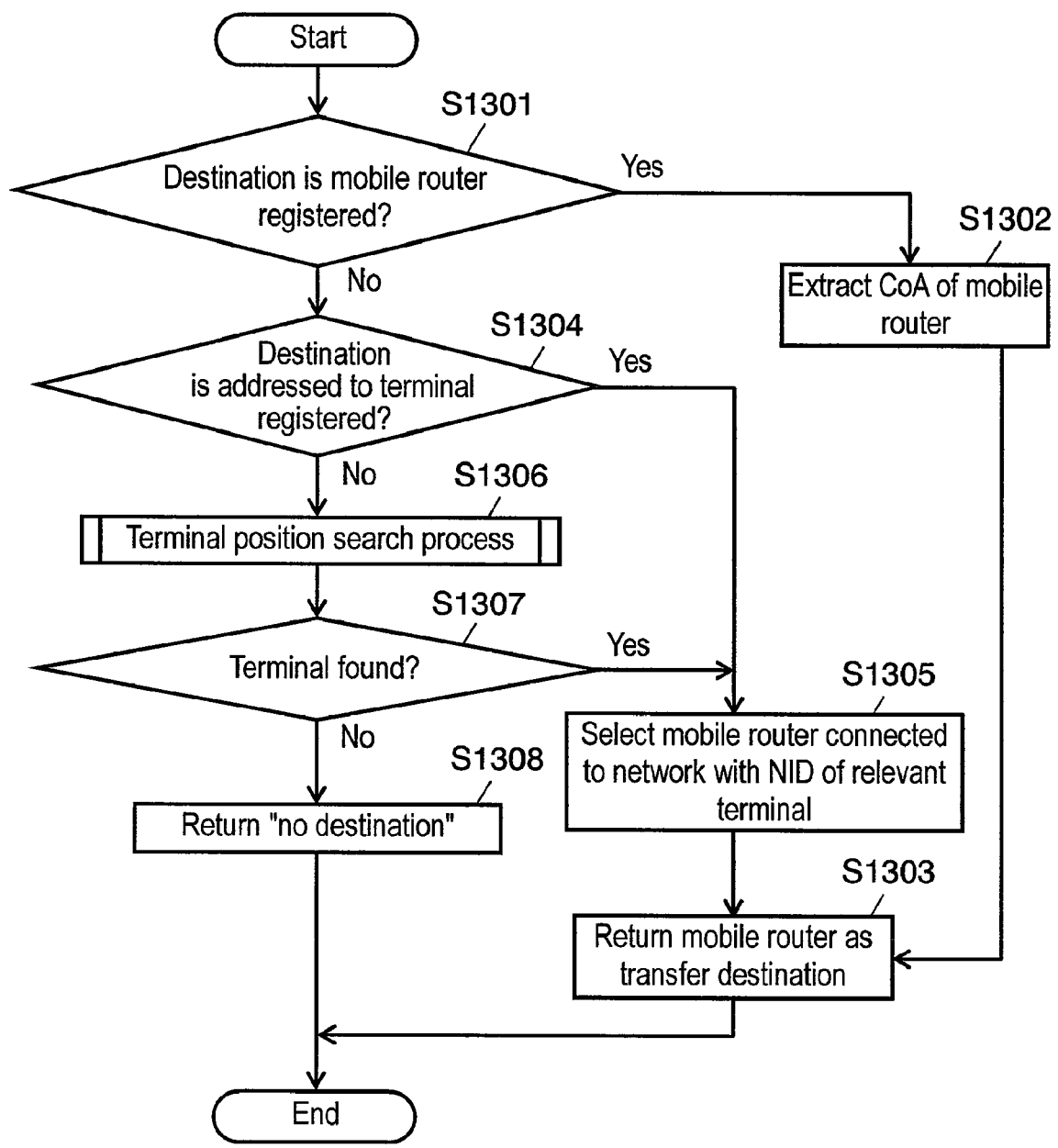
FIG. 13 is a flowchart illustrating the destination search process performed by a home agent according to the embodiment of the present invention.

FIG. 13 is a flowchart illustrating the destination search process.

First, mobile network information managing unit 1004 checks whether or not the destination is a mobile router registered in mobile network information storing unit 1006 (step S1301). If a mobile router registered, unit 1004 extracts CoA 2102 of the mobile router (step S1302). Unit 1004 then returns the CoA of the mobile router extracted as a transfer destination address to packet sending and receiving/relay processing unit 1002 (step S1303).

Meanwhile, if the destination is not a mobile router, mobile network information managing unit 1004 inquires of terminal position information managing unit 1005. Unit 1005 checks whether or not the destination is a terminal recorded in terminal address 2301 stored in terminal position information storing unit 1007 (step S1304), and if recorded, replies to mobile network information managing unit 1004 with NID 2302 of the terminal. Unit 1004 extracts a mobile router having the NID informed, from mobile network information storing unit 1006 (step S1305), and returns the CoA of the mobile router extracted, as a transfer destination address, to packet sending and receiving/relay processing unit 1002 (step S1303). Here, if plural mobile routers have been extracted, unit 1004 selects an optimum mobile router according to the type of the external network interface, the number of packet relay times, or the like.

Meanwhile, in step S1304, if the destination terminal is not record in terminal position information storing unit 1007, terminal position information managing unit 1005 performs a terminal position search process (step S1306). The process is described later.

Consequently, if a terminal is found (step S1307), the process flow proceeds to step S1305, and terminal position information managing unit 1005 extracts NID 2302 of the corresponding terminal from terminal position information storing unit 1007. Then, mobile network information managing unit 1004 extracts the CoA after selecting a mobile router in the same way as the above. Then, unit 1004 returns the CoA of the mobile router extracted, as a transfer destination address, to packet sending and receiving/relay processing unit 1002 (step S1303). In this case as well, if plural mobile routers have been extracted, unit 1004 selects an optimum mobile router.

If a terminal is not found in step S1307, mobile network information managing unit 1004 returns "no destination" to packet sending and receiving/relay processing unit 1002 (step S1308).

Figure 12:
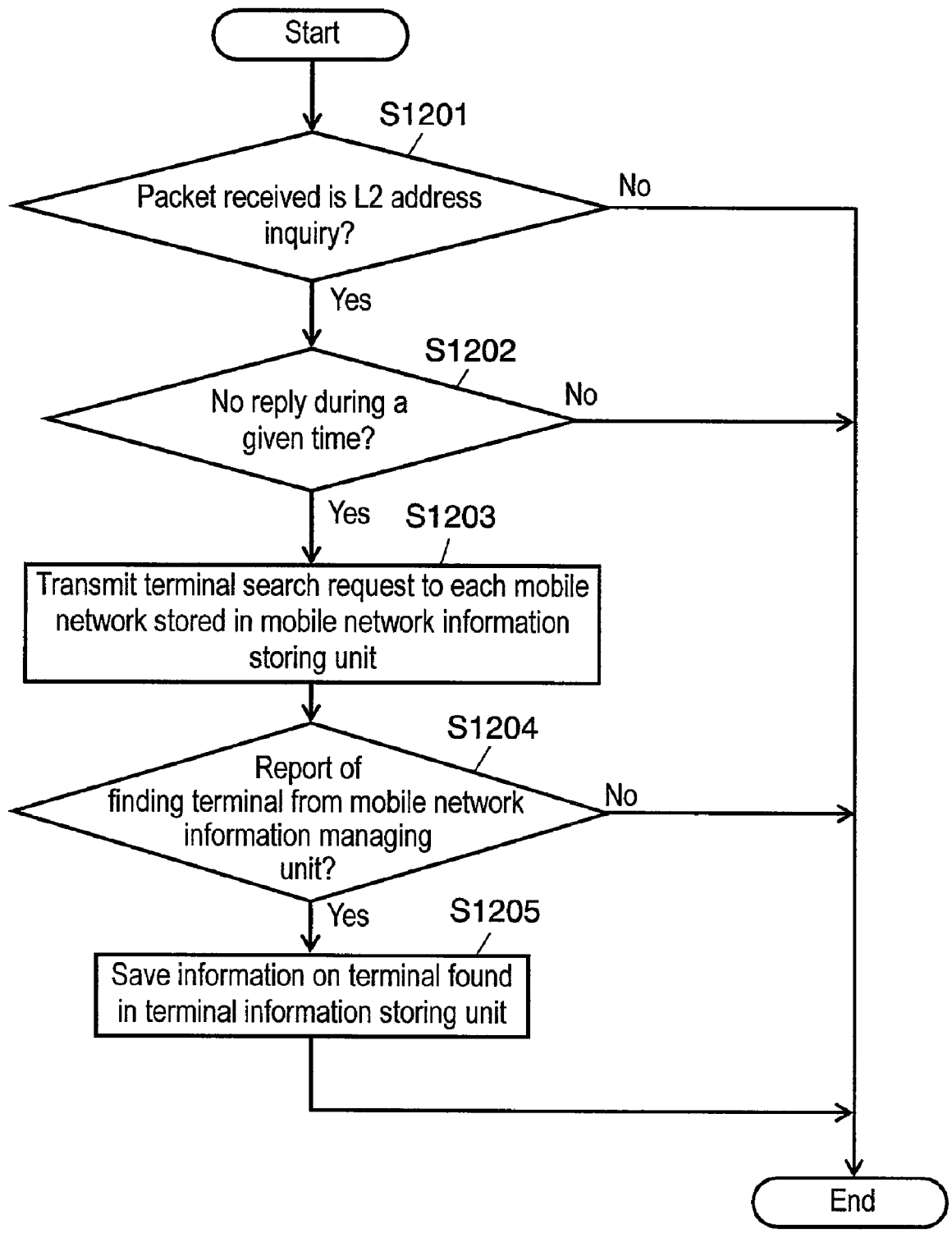
FIG. 12 is a flowchart illustrating the terminal position search process performed by a home agent according to the embodiment of the present invention.

Here, a description is made for the terminal position search process performed in step S1306, using FIG. 12.

FIG. 12 is a flowchart illustrating the terminal position search process.

First, terminal position information managing unit 1005 inquires of packet sending and receiving/relay processing unit 1002 whether or not the packet received is an L2 address inquiry packet (step S1201). If receiving a reply indicating that the packet is not an L2 address inquiry packet, unit 1005 ends the search process.

Meanwhile, if receiving a reply indicating that the packet is an L2 address inquiry packet from unit 1002, unit 1005 directs terminal absence detecting unit 1003 to detect whether or not the terminal is connected to home network 2. Responding to this direction, unit 1003 monitors a reply to the L2 address inquiry packet from the terminal, and if no reply to the inquiry is made within a certain period of time (step S1202), informs unit 1005 that the terminal is not connected to home network 2. Responding to this notice, unit 1005 directs terminal position searching unit 1008 to search for the location of the relevant terminal targeted for the mobile routers registered in mobile network information storing unit 1006. Responding to this direction, terminal position searching unit 1008 transmits a terminal search request to mobile routers in each mobile network recorded in mobile network information storing unit 1006 (step S1203).

Consequently, when unit 1008 receives a terminal position managing packet for informing that a terminal has been found, from a mobile router (step S1204), unit 1008 informs terminal position information managing unit 1005 of terminal address 285 and NID 294 received. Responding to this notice, unit 1005 saves the terminal address and NID in terminal position information storing unit 1007, and ends the process (step S1205).

A terminal search request message by terminal position searching unit 1008 is generated by setting "search" to status 284 of query option 283 in FIG. 22. A terminal position managing packet transmitted form a mobile router when a terminal is found is formed by setting "found" to status 284 of query option 293 in FIG. 23.

Here, when receiving a report of having found a terminal from a mobile router (step S1204), terminal position searching unit 1008 needs to stand by for a certain period of time. This is because unit 1008 is arranged so as not to return any reply if the mobile router does not find a terminal. Searching unit 1008 so as to return a reply even if a mobile router does not find a terminal can increase the process speed.

When transmitting a terminal search request to each mobile network, terminal position searching unit 1008 selects and transmits one or more mobile routers if plural mobile routers are connected to a mobile network. A policy for selection may employ an index such as the reliability of external network interface 503, may be randomly selected from among mobile routers with their connectivity acknowledged, or may employ another selection criterion.

Through the above processes, home agent 10 of the present invention acquires data addressed to terminal 8 in home network 2, and identifies the position of the terminal through inquiring of mobile networks 3, 4 at the time when detecting the terminal 8 is not connected to home network 2. Accordingly, home agent 10 can transfer a packet addressed to terminal 8 to an appropriate mobile network without bearing a load of always managing the terminal position.

Next, a description is made for the terminal position managing method in a mobile network system with the above-described configuration, using the related drawings. In this embodiment, the assumption is made that mobile router 5 is connected to mobile network 3; mobile routers 6, 7, to mobile network 4, as shown in FIG. 1.

Figure 4:
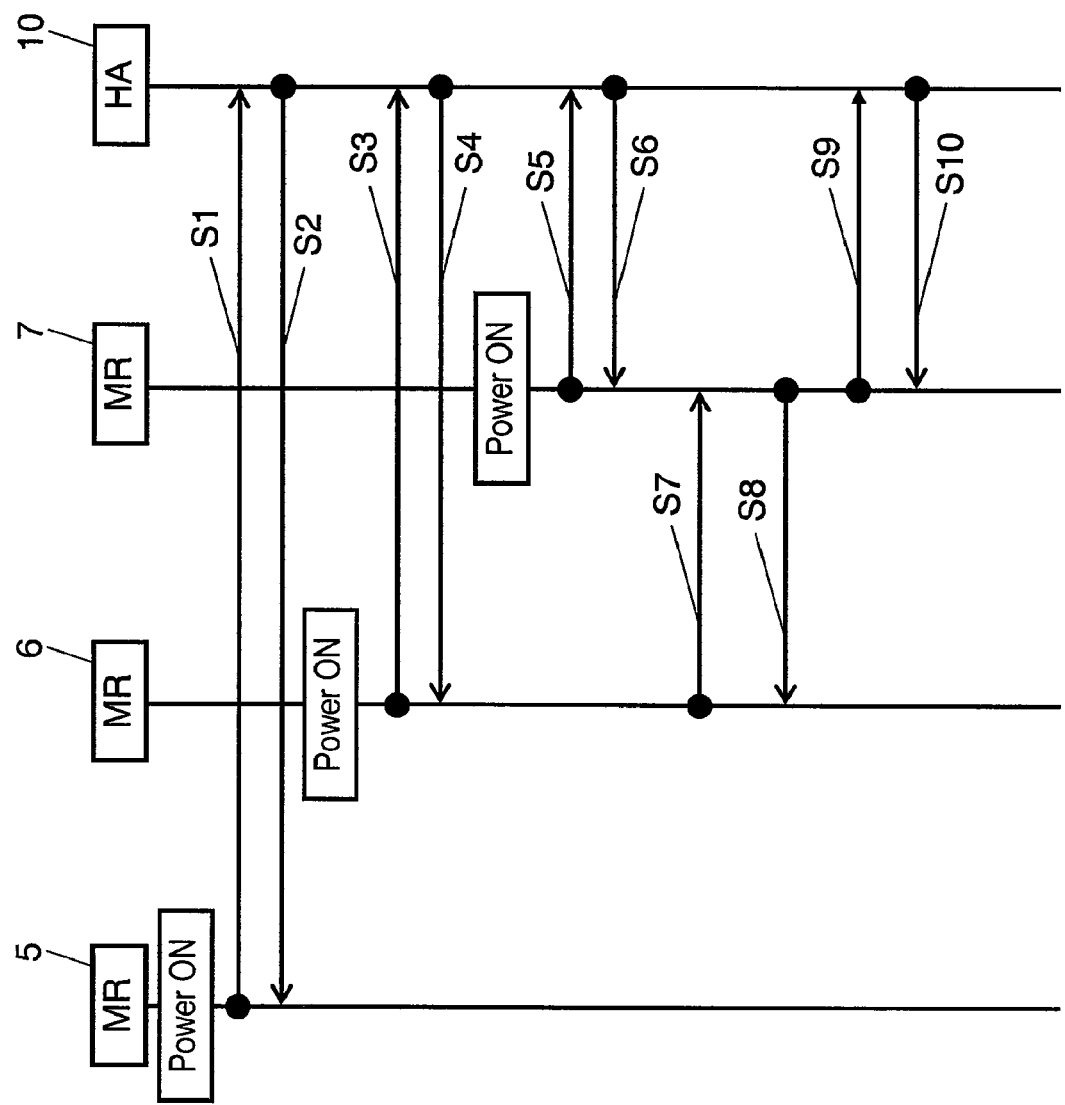
FIG. 4 illustrates a sequence for allocating a network identifier, in the embodiment of the present invention.

FIG. 4 is a sequence diagram showing the operation in which mobile routers 5, 6, 7 register a position in a home agent.

In FIG. 4, after the power is turned on, mobile router 5 transmits an NID allocation request to home agent 10 (step S1).

After receiving the NID allocation request, home agent 10 selects NID=1 to reply to mobile router 5 (step S2). Responding to this reply, mobile router 5 saves NID=1 and the allocation time in identifier information storing unit 509.

Home agent 10 allocates an NID for mobile routers 6, 7 as well in the same way (steps S3 through S6).

The entry in identifier information storing unit 509 of mobile router 7 at this moment is as in FIG. 15A, and the entry in mobile network information storing unit 1006 of home agent 10 is as in FIG. 16A.

Next, mobile routers 5, 6, 7 start to advertise an NID acquired from home agent 10 in mobile networks 3, 4 (steps S7, S8).

Under the circumstances, each mobile router 6, 7 receives an NID advertising packet of the other to compare with that already acquired from home agent 10. Then, mobile routers 6, 7 select an NID with old allocation time preferentially. Mobile router 6 selects an existing NID acquired from home agent 10, and mobile router 7 selects NID=2 received from mobile router 6. Here, mobile router 7 saves the NID received in own identifier information storing unit 509 and transmits an NID update request to home agent 10 (step S9).

Responding to this request, home agent 10 replies to mobile router 7 with a notice that registration has been made (step S10).

The entry in identifier information storing unit 509 of mobile router 7 at this moment is as in FIG. 15B, and the entry in mobile network information storing unit 1006 of home agent 10 is as in FIG. 16B. That is, home agent 10 judges that mobile routers 6, 7 belong to the same mobile network (NID=2). A black circle in the figure indicates a transmission source.

Figure 5:
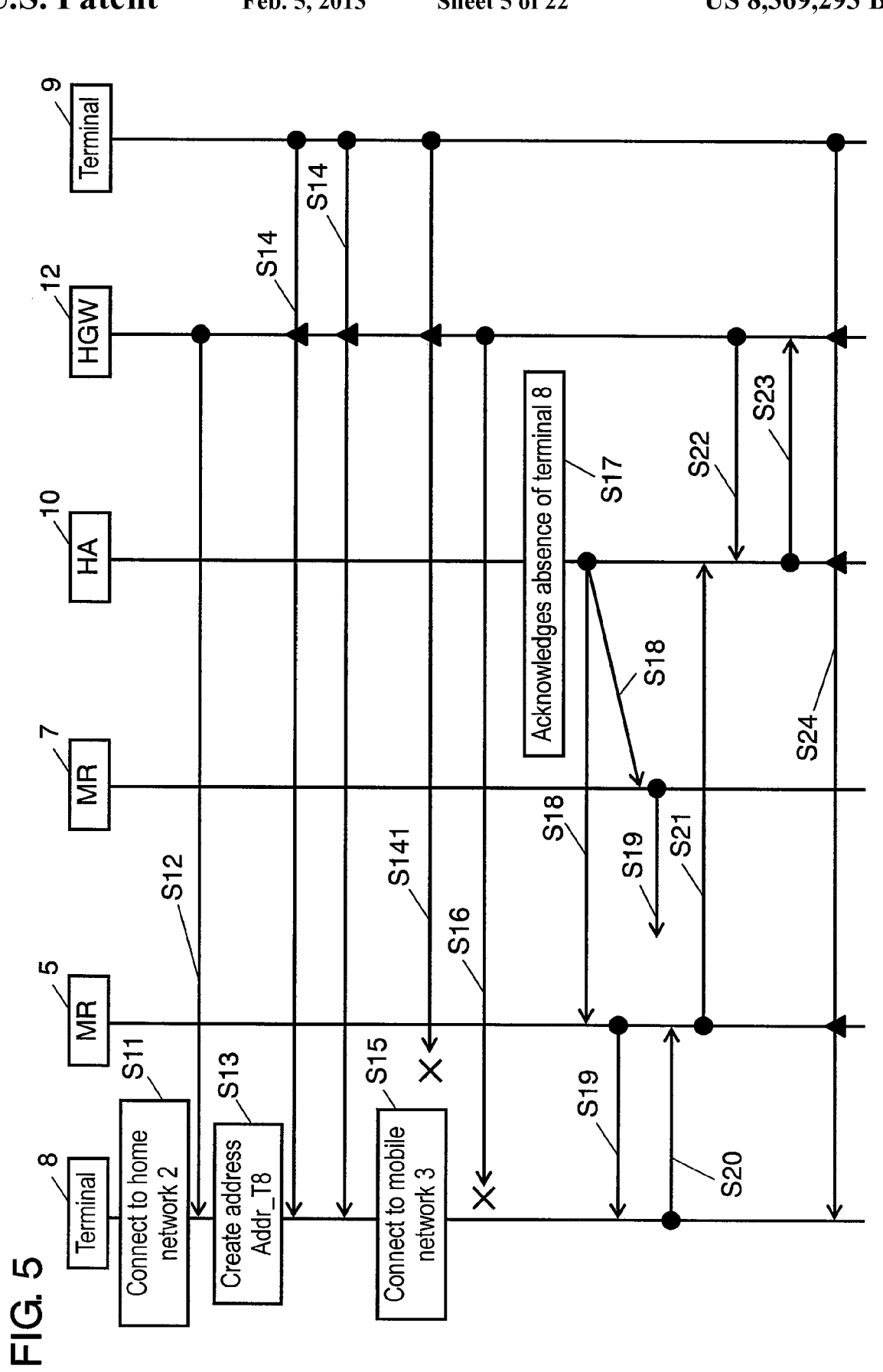
FIG. 5 illustrates a sequence for managing a terminal position, in the embodiment of the present invention.

FIG. 5 is a sequence diagram showing the communication operation in a case where terminal 8 changes its connection destination from home network 2 to mobile network 3.

In FIG. 5, when terminal 8 connects to home network 2 (step S11), HGW 12 advertises router information (ICMPv6 Router Advertisement (RA)) (step S12). Terminal 8 creates an address (Addr_T8) on the basis of a network prefix included in the router information (ICMPv6 Router Advertisement (RA)) (step S13). This address becomes the home address (HoA) of terminal 8.

After that, a packet addressed to terminal 8 is sent from terminal 9 connected to global network 1 to terminal 8 through HGW 12 (step S14).

Next, when terminal 8 moves to mobile network 3 and connects to it (step S15), a packet addressed to terminal 8, that has reached HGW 12, ceases to reach terminal 8 as a destination (step S141).

After that, HGW 12 inquires to acquire an L2 address corresponding to the L3 address (Addr_T8) of terminal 8 (step S16).

Generally, such L2 address inquiry is performed several times (approximately three times) at intervals of one second, and if no reply is made, HGW 12 returns an error to the transmission source (terminal 9 here) as an address unreachable.

An L2 address inquiry is broadcast (or multicast) to all the nodes in home network 2, which means home agent 10 can receive it as well.

After the first L2 address inquiry (step S16), if no reply is made within approximately one second, home agent 10 acknowledges that terminal 8 does not exist in home network 2 (step S17), and transmits a terminal search request packet to mobile routers 5, 7 registered (step S18).

Responding to this request, mobile routers 5, 7 multicast an L2 address inquiry addressed to the address (Addr_T8) of terminal 8 to all the nodes in the own mobile network (step S19). When mobile router 5 receives a reply from terminal 8 (step S20), mobile router 5 sends a terminal position managing packet indicating that terminal 8 has been found, to HA 10 (step S21).

Home agent 10 registers the fact that terminal 8 is connected to mobile network 3 including mobile router 5, in terminal position information storing unit 1007, and informs of the L2 address of home agent 10 itself in order to perform substitute reception for an inquiry (step S22) of L2 address of Addr_T8 from HGW 12 (step S23).

After that, home agent 10 acquires a packet addressed to terminal 8 (Addr_T8) and transfers the packet to mobile router 5 by tunneling (step S24). Here, a black circle in the figure indicates a transmission source; a black triangle, a relay node.

Next, a description is made for the operation in a case where terminal 8 leaves mobile network 3 and moves to mobile network 4.

Figure 6:
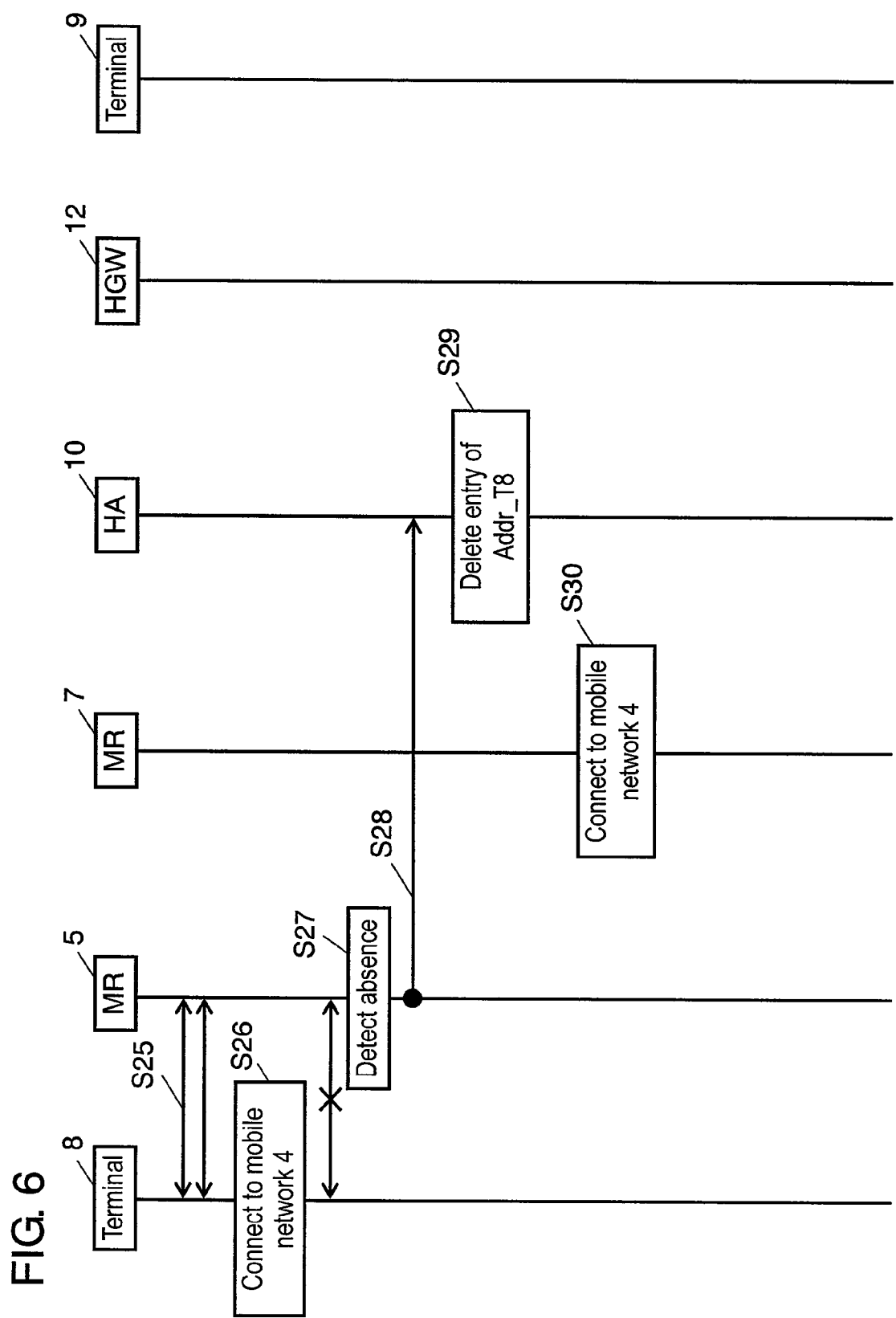
FIG. 6 illustrates a sequence for managing a terminal position, in the embodiment of the present invention.

FIG. 6 is a sequence diagram illustrating the communication operation in this case.

In FIG. 6, after acknowledging that terminal 8 is connected to mobile network 3, mobile router 5 periodically performs L2 address inquiry to terminal 8 to maintain connectivity (step S25).

Next, when terminal 8 leaves mobile network 3 and connects to mobile network 4 (step S26), terminal 8 ceases to reply to an L2 address inquiry from mobile router 5. This condition causes mobile router 5 to recognize the absence of terminal 8 (step S27). Then, mobile router 5 informs home agent 10 that terminal 8 with address Addr_T8 is not connected to mobile network 3, and requests home agent 10 to delete the entry information indicating that terminal 8 is connected to mobile network 3 (step S28).

When receiving this request, home agent 10 deletes the entry of terminal 8 corresponding to Addr_T8 (step S29). Accordingly, when a packet addressed to terminal 8 arrives at home network 2 after the deletion, home agent 10 performs the process again from acknowledging (step S17) the absence of terminal 8.

After that, even if terminal 8 newly connects to mobile network 4 (step S30), mobile router 7 does not inform home agent 10 of the connection of terminal 8.

In this embodiment, the description is made for a case where IPv6 is used, but not limited. Using IPv4 as well enables implementing the present invention.

As described above, according to the present invention, a terminal would adequately retain a given address independently of a network to be connected to, and thus interruption due to address acquisition does not occur during communication with a terminal on the Internet. A home network and mobile network are specified with an NID, and thus a home agent and mobile router can accurately deliver data addressed to a terminal whichever network the terminal connects to.

INDUSTRIAL APPLICABILITY

The present invention is useful for a terminal position managing method in a mobile network system composed of plural mobile networks and a home agent for managing addresses of the mobile networks, and suitable for a case where a terminal without routing function moves to and from a home network and plural mobile networks.

The invention claimed is:

1. A method for managing a position of a terminal in a mobile network system, the mobile network system including a plurality of mobile networks and a home network, the plurality of mobile networks being interconnected with one or more mobile routers and the terminal, the home network including a home agent for managing positions of the plurality of mobile networks, comprising:

detecting, by the home agent, whether or not the terminal having a terminal address based on a network prefix that is common to the mobile networks and the home network is connected to the home agent, when data addressed to the terminal arrives at a home network;

inquiring, by the home agent, a mobile router of a mobile network whether or not the terminal having the terminal address is connected to the mobile network, by utilizing a unique network identifier of the mobile network;

searching, by the mobile router in response to the inquiry whether or not the terminal is connected to the mobile network to which the mobile router belongs, and if the mobile router determines that the terminal is connected to the mobile network, informing the home agent of presence of the terminal; and transferring, by the home agent, the data addressed to the terminal from the home agent to the mobile router that has informed of presence of the terminal, by utilizing the unique network identifier of the mobile network, wherein the mobile networks are not sub-networks of the home network.

2. The method for managing the terminal position, of claim 1, further comprising:

a step at the mobile router of requesting the home agent to allocate a network identifier, the network identifier being an identifier of the mobile network including the mobile router;

a step at the home agent of allocating the network identifier in a response to the request;

a step at the mobile router advertising the network identifier allocated to the mobile network that the mobile router belongs to;

a step at the mobile router in the mobile network, of selecting a network identifier from among one or more network identifiers from one or more other mobile routers acquired from the home agent; and a step at the mobile router, if the network identifier acquired from the home agent is different from the network identifier selected in the step of selecting the network identifier, of registering the network identifier selected, in the home agent.

3. The method for managing the terminal position, of claim 2, further comprising:

a step at the home agent of inquiring a plurality of mobile routers of the mobile network whether or not the terminal having the terminal address is connected to the mobile network, using the unique network identifier of the mobile network, and a step at the home agent, when receiving a respective notice of presence of the terminal from each of the plurality of mobile routers, of selecting a mobile router from among the plurality of mobile routers as a relevant mobile router.

4. The method for managing the terminal position, of claim 1, comprising:

a step at the home agent of inquiring a plurality of mobile routers of the mobile network whether or not the terminal having the terminal address is connected to the mobile network, using the unique network identifier of the mobile network, wherein either one of the plurality of the mobile routers informs the home agent of presence of the terminal, when one of the plurality of mobile routers detects presence of the terminal during the search.

5. The method for managing the terminal position, of claim 1, including:

a step at the home agent of detection of absence of the terminal by acquiring an inquiry of a data link layer address of the terminal and by judging that the terminal is not connected to the home network if no reply is made from the terminal within a given time after acquiring the inquiry.

6. The method for managing the terminal position, of claim 5, further comprising:

a step in which the mobile router, after detecting that the terminal is connected to the mobile network including the mobile router, periodically monitors connection of the terminal; and a step in which the mobile router, when connection of the terminal becomes impossible to be acknowledged, informs the home agent of absence of the terminal.

7. A mobile router in a mobile network system including a plurality of mobile networks and a home network, the plurality of mobile networks being interconnected with at least one mobile router and a terminal, the home network including a home agent for managing positions of the plurality of mobile networks, comprising:

a message receiving unit operable to receive a message from an external network;

a terminal searching unit operable to, when the message receiving unit receives an inquiry requesting whether or not the terminal having a terminal address based on a network prefix that is common to the mobile networks and the home network is connected to the home agent, search whether or not the terminal exists in a mobile network including the mobile router by utilizing a unique network identifier of the mobile network;

a terminal position maintaining unit operable to, after receiving a notice of detecting the terminal from the terminal searching unit, request the terminal searching unit to search for presence of the terminal at intervals of a given time and manages terminal connection; and a terminal absence informing unit operable to inform the home agent of presence of the terminal, responding to a notice of detecting the terminal from the terminal searching unit; and informs the home agent of absence of the terminal, responding to a notice of disconnection of the terminal from the terminal position maintaining unit, wherein the mobile networks are not sub-networks of the home network.

8. The mobile router of claim 7, further comprising:

an identifier acquiring unit operable to acquire a network identifier from the home agent;

an identifier advertising unit operable to advertise the network identifier acquired by the identifier acquiring unit, in the mobile network, and receives a network identifier advertised from another mobile router in the mobile network;

an identifier sharing unit operable to select either of the network identifier advertised from another mobile router in the mobile network and the network identifier of the mobile router;

an identifier updating unit operable to prohibit the identifier advertising unit from advertising, and additionally reregisters the network identifier selected, to the home agent, if the network identifier selected by the identifier sharing unit is different from that acquired by the identifier acquiring unit, wherein the identifier updating unit is operable to update the network identifier registered in the home agent to that acquired from the home agent, if the network identifier reregistered has not been advertised from other mobile router within a given time.

9. A home agent in a mobile network system including a plurality of mobile networks and a home network, the plurality of mobile networks being interconnected with a mobile router and a terminal, the home network including a home agent for managing positions of the plurality of mobile networks, comprising:

a terminal absence detecting unit operable to, when receiving data addressed to the terminal, detect whether or not the terminal having a terminal address based on a network prefix that is common to the mobile networks and the home network is connected to the home agent;

a terminal position searching unit operable to, when the terminal absence detecting unit detects absence of the terminal, transmit messages to the mobile network utilizing a unique network identifier of the mobile network, inquiring whether or not the terminal is connected to the mobile router connected to mobile networks managed by the home agent;

a terminal position information managing unit operable to receive a message of replying to the inquiry and updates management information on the mobile network that the terminal connects to; and a data transferring unit operable to transfer the data addressed to the terminal, to the mobile router by utilizing the unique network identifier of the mobile network, wherein the mobile networks are not sub-networks of the home network.

10. The home agent of claim 9, further comprising:

an identifier allocating unit operable to allocate a network identifier, which is an identifier of the mobile network, according to a request from the mobile router; and an identifier registering unit operable to register the mobile router and a network identifier informed, in connection with each other, according to the request from the mobile router.

11. The home agent of claim 10, wherein the data transferring unit operable to, when informed by the identifier registering unit that the terminal is connected to the mobile network including the plurality of mobile routers, select at least one mobile router from among the plurality of mobile routers and transfers data.

12. The home agent of claim 9, wherein the terminal absence detecting unit is operable to judge that the terminal is not connected to the home network if no reply is made from the terminal within a given time after acquiring a message of inquiring a data link layer address of the terminal in the home network.

13. The home agent of claim 9, wherein the terminal position managing unit is operable to update the management information on the mobile network when receiving a notice of absence of the terminal from the mobile router.

* * * * *